United States Patent
Ly et al.

(10) Patent No.: US 11,006,376 B2
(45) Date of Patent: May 11, 2021

(54) TECHNIQUES TO ENCODE OR DECODE A SELF-DECODABLE PORTION OF A PHYSICAL BROADCAST CHANNEL IN A SYNCHRONIZATION SIGNAL BLOCK

(71) Applicant: QUALCOMM Incorporated, San Diego, CA (US)

(72) Inventors: Hung Ly, San Diego, CA (US); Jing Jiang, San Diego, CA (US); Alberto Rico Alvarino, San Diego, CA (US); Xiao feng Wang, San Diego, CA (US); Tao Luo, San Diego, CA (US); Joseph Binamira Soriaga, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/877,976

(22) Filed: Jan. 23, 2018

(65) Prior Publication Data
US 2018/0310262 A1    Oct. 25, 2018

Related U.S. Application Data

(60) Provisional application No. 62/488,637, filed on Apr. 21, 2017, provisional application No. 62/564,030, filed on Sep. 27, 2017.

(51) Int. Cl.
*H04W 56/00* (2009.01)
*H04L 1/00* (2006.01)
(Continued)

(52) U.S. Cl.
CPC ......... *H04W 56/001* (2013.01); *H04L 1/0009* (2013.01); *H04L 1/0045* (2013.01);
(Continued)

(58) Field of Classification Search
CPC . H04W 56/00; H04W 56/0045; H04W 84/18; H04J 3/0682; H04L 7/042
(Continued)

(56) References Cited

U.S. PATENT DOCUMENTS 7,577,881 B1 *   8/2009  Shridhar ........... H03M 13/2732
                                                         714/702
9,553,701 B2    1/2017  Sadeghi et al.
(Continued)

FOREIGN PATENT DOCUMENTS

WO    WO-2017053024 A1    3/2017

OTHER PUBLICATIONS

3GPP TSG RAN WG1 Meeting #80, R1-150147, Athens, Greece, Feb. 9-13, 2015, Source ZTE, Title Further Considerations on Physical Broadcast Channel for MTC enhancement, Agenda Item: 7.3.1.2.3 (Year: 2015).*

(Continued)

*Primary Examiner* — Peter G Solinsky
*Assistant Examiner* — Sanjay K Dewan
(74) *Attorney, Agent, or Firm* — Holland & Hart LLP

(57) ABSTRACT

Techniques for wireless communication are described. A method of wireless communication at a user equipment (UE) includes receiving a synchronization signal within a synchronization signal (SS) block; receiving at least a portion of a physical broadcast channel (PBCH) of the SS block, the PBCH comprising a self-decodable portion and an outside portion; and decoding the PBCH based at least in part on receiving the self-decodable portion of the PBCH. The synchronization signal has a first bandwidth. The self-decodable portion of the PBCH has a second bandwidth substantially within the first bandwidth. The outside portion having a bandwidth that is outside of the second bandwidth (Continued)

and within a PBCH bandwidth, the PBCH bandwidth being greater than the first bandwidth.

82 Claims, 18 Drawing Sheets

(51) Int. Cl.
    *H04L 5/00*           (2006.01)
    *H04L 1/08*           (2006.01)
    *H04L 1/04*           (2006.01)
    *H04W 88/08*        (2009.01)
    *H04W 88/02*        (2009.01)

(52) U.S. Cl.
    CPC .......... *H04L 1/0057* (2013.01); *H04L 1/0071* (2013.01); *H04L 1/04* (2013.01); *H04L 1/08* (2013.01); *H04L 5/005* (2013.01); *H04L 5/0053* (2013.01); *H04W 88/02* (2013.01); *H04W 88/08* (2013.01)

(58) Field of Classification Search
    USPC .......................................................... 370/350
    See application file for complete search history.

(56) References Cited

U.S. PATENT DOCUMENTS

| | | | |
|---|---|---|---|
| 9,775,134 B2 | 9/2017 | Papasakellariou et al. | |
| 10,334,562 B2* | 6/2019 | Papasakellariou | H04W 72/005 |
| 10,660,102 B1* | 5/2020 | Patel | H04W 48/00 |
| 2009/0176463 A1* | 7/2009 | Raaf | H04B 7/0619 455/101 |
| 2011/0092240 A1* | 4/2011 | Aiba | H04L 1/0025 455/509 |
| 2011/0256868 A1* | 10/2011 | Nogami | H04J 11/0069 455/435.1 |
| 2011/0274077 A1* | 11/2011 | Yamada | H04L 5/0096 370/329 |
| 2011/0275338 A1* | 11/2011 | Seshadri | H04L 25/0384 455/205 |
| 2012/0009959 A1* | 1/2012 | Yamada | H04B 7/0413 455/507 |
| 2015/0009874 A1* | 1/2015 | Edara | H04W 72/1268 370/311 |
| 2015/0085795 A1* | 3/2015 | Papasakellariou | H04L 5/0044 370/329 |
| 2015/0256314 A1 | 9/2015 | Gauvreau et al. | |
| 2015/0341908 A1* | 11/2015 | Wang | H04L 5/0053 370/312 |
| 2016/0014718 A1* | 1/2016 | Mysore Balasubramanya | H04W 68/02 455/458 |
| 2016/0029179 A1* | 1/2016 | Kim | H04W 72/005 370/312 |
| 2016/0205644 A1* | 7/2016 | Seo | H04W 56/00 370/350 |
| 2017/0064685 A1 | 3/2017 | Rico Alvarino et al. | |
| 2017/0094621 A1 | 3/2017 | Xu et al. | |
| 2017/0288831 A1* | 10/2017 | Cezanne | H04L 27/2613 |
| 2018/0054800 A1* | 2/2018 | Yeo | H04W 72/08 |
| 2018/0084593 A1* | 3/2018 | Chen | H04W 76/11 |
| 2018/0123849 A1* | 5/2018 | Si | H04J 11/0073 |
| 2018/0227866 A1* | 8/2018 | Jung | H04W 56/001 |
| 2019/0222377 A1* | 7/2019 | Liu | H04L 5/00 |
| 2019/0364523 A1* | 11/2019 | Wei | H04W 76/11 |
| 2020/0053781 A1* | 2/2020 | Pan | H04J 11/0069 |

OTHER PUBLICATIONS

3GPP TSG RAN WG1 Meeting #88bis, R1-1704323, Spokane, USA Apr. 3-7, 2017, Source: Ericsson, Title: On Channel Coding of NR-PBCH, Agenda 8.1.4.3 (Year: 2017).*

3GPP TSG RAN WG1 Meeting #88bis, R1-1704249, Spokane, USA Apr. 3-7, 2017, Agenda Item: 8.1.4.3, Source: Huawei, HiSilicon, Title: Channel Coding for PBCH (Year: 2017).*

Ericsson: "On Channel Coding of NR-PBCH," 3GPP Draft, R1-1704323 on Channel Coding of NR-PBCH, 3rd Generation Partnership Project (3GPP), Mobile Competence Centre, 650, Route Des Lucioles, F-06921 Sophia-Antipolis Cedex, France, vol. RAN WG1, No, Spokane, USA, Apr. 3, 2017-Apr. 7, 2017, Apr. 2, 2017 (Apr. 2, 2017), XP051242475, 6 Pages, Retrieved from the Internet: URL:http://www.3gpp.org/ftp/Meetings_3GPP_SYNC/RAN1/Docs/ [retrieved on Apr. 2, 2017].

Huawei et al., "Channel Coding for PBCH," 3GPP Draft, R1-1704249, 3rd Generation Partnership Project (3GPP), Mobile Competence Centre, 650, Route Des Lucioles, F-06921 Sophia-Antipolis Cedex, France, vol. RAN WG1, No, Spokane USA, Apr. 3, 2017-Apr. 7, 2017, Apr. 2, 2017 (Apr. 2, 2017), XP051242401, 6 Pages, Retrieved from the Internet: URL:http://www.3gpp.org/ftp/Meetings_3GPP_SYNC/RAN1/Docs! [retrieved on Apr. 2, 2017].

International Search Report and Written Opinion—PCT/US2018/023835—ISA/EPO—dated Jun. 27, 2018.

LG Electronics: "Discussion on Low Cost UEs," 3GPP Draft, R1-144891, 3rd Generation Partnership Project (3GPP), Mobile Competence Centre ; 650, Route Des Lucioles, F-06921 Sophia-Antipolis Cedex, France, vol. RAN WG1, No, San Francisco, USA, Nov. 17, 2014-Nov. 21, 2014, Nov. 17, 2014 (Nov. 17, 2014), XP050875949, 6 Pages, Retrieved from the Internet: URL:http://www.3gpp.org/ftp/Meetings_3GPP_SYNC/RAN1/Docs/ [retrieved on Nov. 17, 2014].

ZTE: "Further Considerations on Physical Broadcast Channel for MTC Enhancement", 3GPP Draft; R1-150147-FINAL, 3<sup>RD</sup> Generation Partnership Project (3GPP), Mobile Competence Centre; 650, Route Des Lucioles ; F-06921 Sophia-Antipolis Cedex; France, vol. RAN WG1, no. Athens, Greece; Feb. 9, 2015-Feb. 13, 2015, Feb. 8, 2015 (Feb. 8, 2015), XP050933361, Retrieved from the Internet: URL: http://www.3gpp.org/ftp/Meetings3GPPSYNC/RAN1/Docs/—[retrieved on Feb. 8, 2015].

* cited by examiner

TECHNIQUES TO ENCODE OR DECODE A SELF-DECODABLE PORTION OF A PHYSICAL BROADCAST CHANNEL IN A SYNCHRONIZATION SIGNAL BLOCK

CROSS REFERENCES

The present Application for Patent claims priority to U.S. Provisional Patent Application No. 62/488,637 by Ly et al., entitled "Techniques To Encode or Decode a Self-Decodable Portion of a Physical Broadcast Channel in a Synchronization Signal Block," filed Apr. 21, 2017, and to U.S. Provisional Patent Application No. 62/564,030 by Ly et al., entitled "Techniques to Encode or Decode a Self-Decodable Portion of a Physical Broadcast Channel in a Synchronization Signal Block" filed Sep. 27, 2017, and assigned to the assignee hereof.

BACKGROUND

Field of the Disclosure

The present disclosure, for example, relates to wireless communication systems, and more particularly to techniques to encode or decode a self-decodable portion of a physical broadcast channel (PBCH) in a synchronization signal (SS) block.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In a next generation, new radio (NR), millimeter wave (mmW), or 5G network, a base station may take the form of a smart radio head (or radio head (RH)) or access node controller (ANC), with a set of smart radio heads in communication with an ANC defining a gNodeB (gNB). A base station may communicate with a set of UEs on downlink channels (e.g., for transmissions from a base station to a UE) and uplink channels (e.g., for transmissions from a UE to a base station).

Wireless devices that operate in mmW frequency ranges (e.g., 28 GHz, 40 GHz, 60 GHz, etc.) may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. In some cases, a base station may transmit signals on a broadcast channel by repetitively transmitting the signals while changing the beam on which the signals are transmitted (e.g., the base station may transmit the signals on each of a plurality of beams while performing a beam sweep). In other cases, a base station may repetitively transmit signals on a broadcast channel without changing the beam on which the signals are transmitted. In some cases, a base station may repetitively transmit a group of signals defining a synchronization signal (SS) block. The signals transmitted within the SS block may include, for example, a primary synchronization signal (PSS), a secondary synchronization signal (SSS), and/or a physical broadcast channel (PBCH). These signals may be used by a UE for cell measurement, acquisition of a network, or other purposes.

SUMMARY

Some user equipments (UEs) may only be capable of receiving transmissions over a wireless spectrum within a narrow band, or may have a maximum receive bandwidth that is less than a system bandwidth or less than a wideband transmission bandwidth of another device (e.g., a base station). Other UEs may be capable of receiving transmissions over a wireless spectrum across the entirety of a system bandwidth, or across the entirety of a wideband transmission bandwidth of another device (e.g., a base station), but may be operated within a narrower band, when appropriate, to conserve power. In some cases, a synchronization signal (SS) block may include a time division multiplexed physical broadcast channel (PBCH) and set of one or more synchronization signals. The synchronization signal(s) may be transmitted within a narrower bandwidth than the PBCH. Techniques described in the present disclosure enable a base station to transmit a PBCH including a self-decodable portion, and enable a UE to decode the self-decodable portion of the PBCH without receiving the PBCH over the entire bandwidth over which the PBCH is transmitted. The self-decodable portion of the PBCH may have a bandwidth that is substantially within the bandwidth of at least one synchronization signal transmitted in an SS block.

In one example, a method of wireless communication at a UE is described. The method may include receiving a synchronization signal within an SS block; receiving at least a portion of a PBCH of the SS block, the PBCH comprising a self-decodable portion and an outside portion; and decoding the PBCH based at least in part on receiving the self-decodable portion of the PBCH. The synchronization signal may have a first bandwidth. The self-decodable portion of the PBCH may have a second bandwidth substantially within the first bandwidth. The outside portion may have a bandwidth that is outside of the second bandwidth and within a PBCH bandwidth, the PBCH bandwidth may be greater than the first bandwidth.

In one example, an apparatus for wireless communication at a UE is described. The apparatus may include means for receiving a synchronization signal within an SS block; means for receiving at least a portion of a PBCH of the SS block, the PBCH comprising a self-decodable portion and an outside portion; and mean for decoding the PBCH based at least in part on receiving the self-decodable portion of the PBCH. The synchronization signal may have a first bandwidth. The self-decodable portion of the PBCH may have a second bandwidth substantially within the first bandwidth. The outside portion may have a bandwidth that is outside of the second bandwidth and within a PBCH bandwidth, the PBCH bandwidth may be greater than the first bandwidth.

In one example, another apparatus for wireless communication at a UE is described. The apparatus may include a processor, memory in electronic communication with the processor, and instructions stored in the memory. The instructions may be executable by the processor to receive a synchronization signal within an SS block; receive at least a portion of a PBCH of the SS block, the PBCH comprising a self-decodable portion and an outside portion; and decode the PBCH based at least in part on receiving the self-decodable portion of the PBCH. The synchronization signal may have a first bandwidth. The self-decodable portion of the PBCH may have a second bandwidth substantially within the first bandwidth. The outside portion may have a bandwidth that is outside of the second bandwidth and within a PBCH bandwidth, the PBCH bandwidth may be greater than the first bandwidth.

In one example, a non-transitory computer-readable medium storing computer-executable code for wireless communication at a UE is described. The code may be executable by a processor to receive a synchronization signal within an SS block; to receive at least a portion of a PBCH of the SS block, the PBCH comprising a self-decodable portion and an outside portion; and to decode the PBCH based at least in part on receiving the self-decodable portion of the PBCH. The synchronization signal may have a first bandwidth. The self-decodable portion of the PBCH may have a second bandwidth substantially within the first bandwidth. The outside portion may have a bandwidth that is outside of the second bandwidth and within a PBCH bandwidth, the PBCH bandwidth may be greater than the first bandwidth.

In some examples of the method, apparatus, and non-transitory computer-readable medium described above, received bits of the PBCH may be polar-encoded and randomly interleaved, and decoding the PBCH may include performing a polar decode of the PBCH based on a set of bits of the PBCH included in the self-decodable portion of the PBCH. In some of these examples, the received bits of the PBCH may be S-random interleaved.

In some examples of the method, apparatus, and non-transitory computer-readable medium described above, received bits of the PBCH may be interleaved using a triangular interleaver, a convolutional interleaver, a rectangular interleaver, or a Parallel-rectangular interleaver.

In some examples of the method, apparatus, and non-transitory computer-readable medium described above, received bits of the PBCH may be polar-encoded, and decoding the PBCH may include characterizing bits of the PBCH associated with tones outside the first bandwidth as punctured bits of a polar code.

In some examples of the method, apparatus, and non-transitory computer-readable medium described above, received bits of the PBCH may be low-density parity-check (LDPC)-encoded, and decoding the PBCH may include mapping a set of bits of the PBCH, included in the self-decodable portion of the PBCH, to at least a self-decodable core of an LDPC graph.

In some examples of the method, apparatus, and non-transitory computer-readable medium described above, received bits of the PBCH may be polar-encoded, LDPC-encoded, or tail-biting convolutional code (TBCC)-encoded, and encoded bits of the PBCH included in the self-decodable portion of the PBCH may include all PBCH information. In some examples, encoded bits of the PBCH included in the self-decodable portion of the PBCH may also include repeated PBCH information. In some examples, encoded bits of the PBCH outside the self-decodable portion of the PBCH may include repeated PBCH information.

Some examples of the method, apparatus, and non-transitory computer-readable medium described above may further include processes, features, means, or instructions for receiving, from a base station, an indication that the SS block includes the self-decodable portion of the PBCH. In some examples, the indication may be signaled in the at least one synchronization signal. In some examples, the at least one synchronization signal may include a primary synchronization signal (PSS) transmitted from an antenna port of a base station and a secondary synchronization signal (SSS) transmitted from the antenna port of the base station, and receiving the indication that the SS block includes the self-decodable portion of the PBCH may include detecting a difference between the PSS and the SSS.

Some examples of the method, apparatus, and non-transitory computer-readable medium described above may further include processes, features, means, or instructions for receiving, from a base station, at least one of: a first indication of the first bandwidth, a second indication of a sync signal frequency, or a combination thereof.

Some examples of the method, apparatus, and non-transitory computer-readable medium described above may further include processes, features, means, or instructions for tuning a receiver of the UE to the first bandwidth.

In some examples of the method, apparatus, and non-transitory computer-readable medium described above, the PBCH may be decoded based on a tone mapping that begins within the second bandwidth and alternates about a sync signal frequency within at least the second bandwidth.

In some examples of the method, apparatus, and non-transitory computer-readable medium described above, the PBCH may be decoded based on a tone mapping that begins within the second bandwidth and is sequential within the second bandwidth.

In some examples of the method, apparatus, and non-transitory computer-readable medium described above, the self-decodable portion of the PBCH may be received in at least a first symbol and a second symbol and may be rate matched to both the first symbol and the second symbol.

In some examples of the method, apparatus, and non-transitory computer-readable medium described above, the PBCH may occupy at least a first symbol and a second symbol and may be rate matched to the first symbol and repeated in the second symbol. In some examples, the PBCH may be associated with a quasi-random phase shift in each of a plurality of resource elements.

In some examples of the method, apparatus, and non-transitory computer-readable medium described above, the at least one synchronization signal may include at least one of: a PSS, an SSS, or a combination thereof.

In one example, a method of wireless communication at a base station is described. The method may include transmitting at least one synchronization signal as part of an SS block. The at least one synchronization signal may have a first bandwidth. The method may also include formatting a PBCH to be transmitted within a PBCH bandwidth that is greater than the first bandwidth, and transmitting the PBCH as part of the SS block. The PBCH may include a self-decodable portion to be transmitted within a second bandwidth that is substantially within the first bandwidth. The PBCH may include an outside portion to be transmitted in a bandwidth that is outside of the second bandwidth and within the PBCH bandwidth.

In one example, an apparatus for wireless communication at a base station is described. The apparatus may include means for transmitting at least one synchronization signal as part of an SS block. The at least one synchronization signal may have a first bandwidth. The apparatus may also include means for formatting a PBCH to be transmitted within a PBCH bandwidth that is greater than the first bandwidth, and means for transmitting the PBCH as part of the SS block. The PBCH may include a self-decodable portion to be transmitted within a second bandwidth that is substantially within the first bandwidth. The PBCH may include an outside portion to be transmitted in a bandwidth that is outside of the second bandwidth and within the PBCH bandwidth.

In one example, another apparatus for wireless communication at a base station is described. The apparatus may include a processor, memory in electronic communication with the processor, and instructions stored in the memory. The instructions may be executable by the processor to transmit at least one synchronization signal as part of an SS block. The at least one synchronization signal may have a first bandwidth. The instructions may also be executable by the processor to format a PBCH to be transmitted within a PBCH bandwidth that is greater than the first bandwidth, and to transmit the PBCH as part of the SS block. The PBCH may include a self-decodable portion to be transmitted within a second bandwidth that is substantially within the first bandwidth. The PBCH may include an outside portion to be transmitted in a bandwidth that is outside of the second bandwidth and within the PBCH bandwidth.

In one example, a non-transitory computer-readable medium storing computer-executable code for wireless communication at a base station is described. The code may be executable by a processor to transmit at least one synchronization signal as part of an SS block. The at least one synchronization signal may have a first bandwidth. The code may also be executable by the processor to format a PBCH to be transmitted within a PBCH bandwidth that is greater than the first bandwidth, and to transmit the PBCH as part of the SS block. The PBCH may include a self-decodable portion to be transmitted within a second bandwidth that is substantially within the first bandwidth. The PBCH may include an outside portion to be transmitted in a bandwidth that is outside of the second bandwidth and within the PBCH bandwidth.

Some examples of the method, apparatus, and non-transitory computer-readable medium described above may further include processes, features, means, or instructions for polar-encoding bits of the PBCH, and randomly interleaving the polar-encoded bits of the PBCH within at least the second bandwidth. In some examples, interleaving the polar-encoded bits of the PBCH may include S-random interleaving the polar-encoded bits of the PBCH.

Some examples of the method, apparatus, and non-transitory computer-readable medium described above may further include processes, features, means, or instructions for polar-encoding bits of the PBCH, and interleaving the polar-encoded bits of the PBCH by using a triangular interleaver, a convolutional interleaver, a rectangular interleaver, or a Parallel-rectangular interleaver.

Some examples of the method, apparatus, and non-transitory computer-readable medium described above may further include processes, features, means, or instructions for polar-encoding bits of the PBCH, and mapping higher capacity polar-encoded bits of the PBCH to the second bandwidth.

Some examples of the method, apparatus, and non-transitory computer-readable medium described above may further include processes, features, means, or instructions for LDPC-encoding bits of the PBCH, and mapping at least LDPC-encoded bits of the PBCH that are associated with a self-decodable core of an LDPC graph to the second bandwidth.

Some examples of the method, apparatus, and non-transitory computer-readable medium described above may further include processes, features, means, or instructions for encoding bits of the PBCH using a polar encoding, a LDPC encoding, or a TBCC encoding, and mapping encoded bits representing all PBCH information to the second bandwidth. In some examples, the method, apparatus, and non-transitory computer-readable medium may further include processes, features, means, or instructions for mapping encoded bits representing repeated PBCH information to the second bandwidth. In some examples, the method, apparatus, and non-transitory computer-readable medium may further include processes, features, means, or instructions for mapping encoded bits representing repeated PBCH information to a portion of the PBCH bandwidth outside the second bandwidth.

Some examples of the method, apparatus, and non-transitory computer-readable medium described above may further include processes, features, means, or instructions for transmitting an indication that the SS block includes the self-decodable portion of the PBCH. In some examples, transmitting the indication may include signaling the indication in the at least one synchronization signal. In some examples, the at least one synchronization signal may include a PSS transmitted from an antenna port of the base station and an SSS transmitted from the antenna port of the base station, and signaling the indication in the at least one synchronization signal may include encoding the indication in a difference between the PSS and the SSS.

Some examples of the method, apparatus, and non-transitory computer-readable medium described above may further include processes, features, means, or instructions for transmitting at least one of a first indication of the first bandwidth, a second indication of a sync signal frequency, or a combination thereof.

In some examples of the method, apparatus, and non-transitory computer-readable medium described above, the PBCH may be mapped to tones in at least the second bandwidth using a tone mapping that begins within the second bandwidth and alternates about a sync signal frequency within at least the second bandwidth.

In some examples of the method, apparatus, and non-transitory computer-readable medium described above, the PBCH may be mapped to tones in the second bandwidth using a tone mapping that begins within the second bandwidth and is sequential within the second bandwidth.

In some examples of the method, apparatus, and non-transitory computer-readable medium described above, the PBCH may be transmitted in at least a first symbol and a second symbol and is rate matched to both the first symbol and the second symbol.

In some examples of the method, apparatus, and non-transitory computer-readable medium described above, the PBCH may be transmitted in at least a first symbol and a second symbol and is rate matched to the first symbol and repeated in the second symbol.

In some examples of the method, apparatus, and non-transitory computer-readable medium described above, the PBCH may be associated with a quasi-random phase shift in each of a plurality of resource elements.

In some examples of the method, apparatus, and non-transitory computer-readable medium described above, the at least one synchronization signal may include at least one of: a PSS, an SSS, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
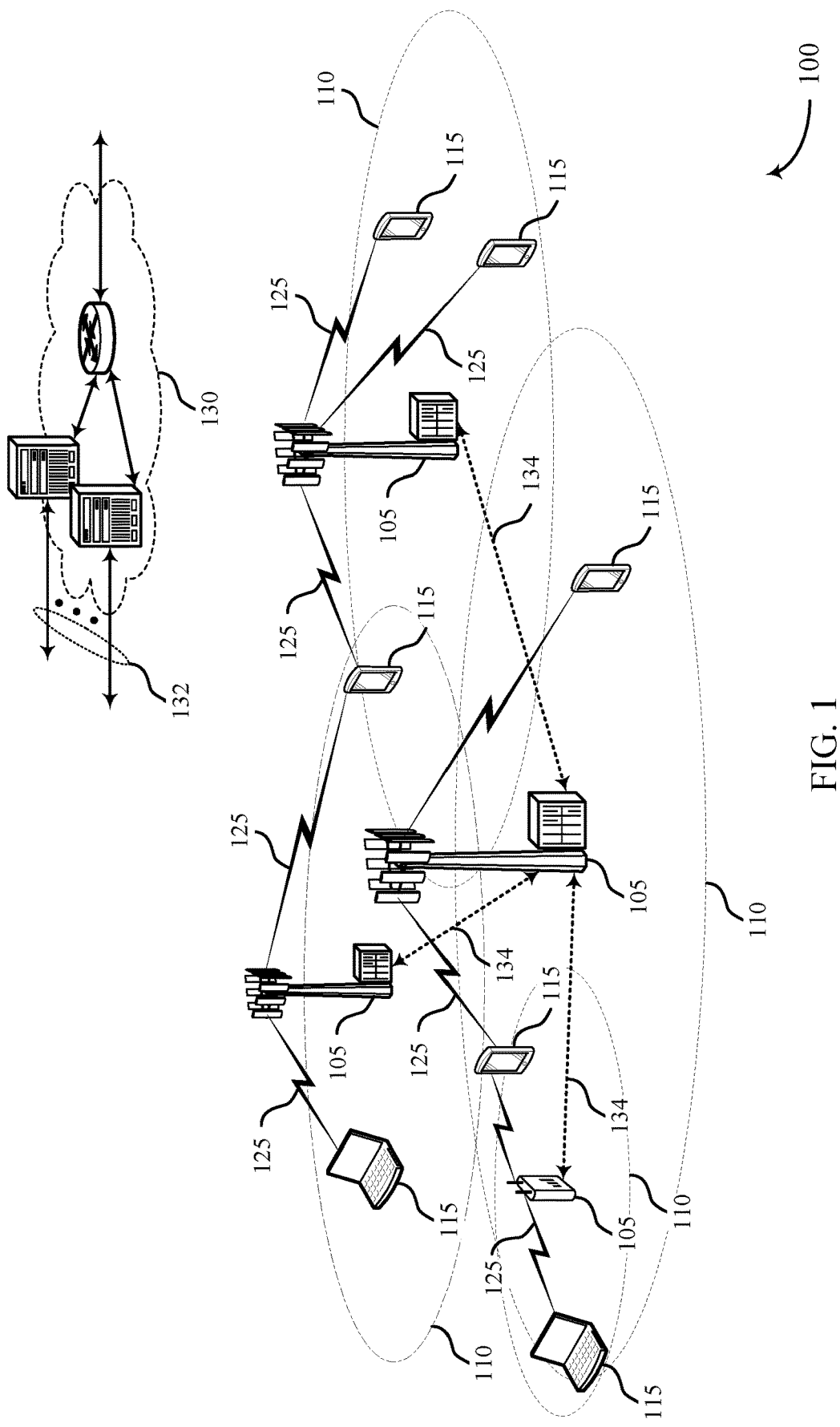
FIG. 1 shows an example of a wireless communication system, in accordance with various aspects of the present disclosure.

A wireless communication system (e.g., a mmW system) may utilize directional or beamformed transmissions (e.g., beams) for communication. For example, a base station may transmit signals on multiple beams associated with different directions. In some cases, the base station may engage in beam sweeping over a portion (or all) of the possible beams for transmitting messages or signals intended for user equipments (UEs) distributed throughout a coverage area of the base station. For example, a base station may transmit multiple instances of an SS block, on different beams, during a periodic broadcast channel transmission time interval (BCH TTI). In other cases, a base station may transmit multiple instances of a synchronization signal (SS) block on a same beam, or in an omnidirectional manner, during a periodic BCH TTI.

In some examples, an SS block may include a primary synchronization signal (PSS), a secondary synchronization signal (SSS), a physical broadcast channel (PBCH), and/or other synchronization signals (e.g., a tertiary synchronization signal (TSS)). In some examples, the signals included in an SS block may include a PSS, an SSS, a PBCH, and/or other synchronization signals that are time division multiplexed. For example, the signals included in an SS block may include a time division multiplexed first PBCH, SSS, second PBCH, and PSS (transmitted in the indicated order), or a time division multiplexed first PBCH, SSS, PSS, and second PBCH (transmitted in the indicated order), etc.

A UE that receives an SS block may perform a cell measurement on the SS block, and in some cases may acquire a network associated with a base station that transmitted the SS block. When acquiring a network based at least in part on the SS block, in some examples, a UE may obtain: symbol timing from a PSS of the SS block, a physical cell identity (ID) from a combination of the PSS and an SSS of the SS block, frame timing from the SSS, and system information (e.g., a set of minimum system information (SI)) from a PBCH of the SS block. Techniques described in the present disclosure enable a base station to transmit, in an SS block, a PBCH including a self-decodable portion. Techniques described in the present disclosure also enable a UE to decode the self-decodable portion of the PBCH, without receiving the PBCH over the entire bandwidth over which the PBCH is transmitted. The self-decodable portion of the PBCH may have a bandwidth that is substantially within the bandwidth of at least one synchronization signal transmitted in an SS block (e.g., within a bandwidth of a PSS and/or SSS).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

FIG. 1 shows an example of a wireless communication system 100, in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) or gNodeBs (gNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

At times, a UE 115 may perform an initial access (acquisition) procedure with a base station 105, synchronize with a base station 105, or measure signals transmitted by a base station 105. When performing the initial access procedure (or synchronizing, or performing measurements), the UE 115 may search a wireless spectrum for an SS block transmitted by the base station 105. The SS block may include information usable by the UE 115 to synchronize the UE 115 with the base station 105, so that the UE 115 may communicate with the base station 105 (or over a network to which the base station 105 provides access). After synchronizing with the base station 105, the UE 115 may initiate a random access procedure with the base station 105 by transmitting a random access preamble to the base station 105.

Figure 2:
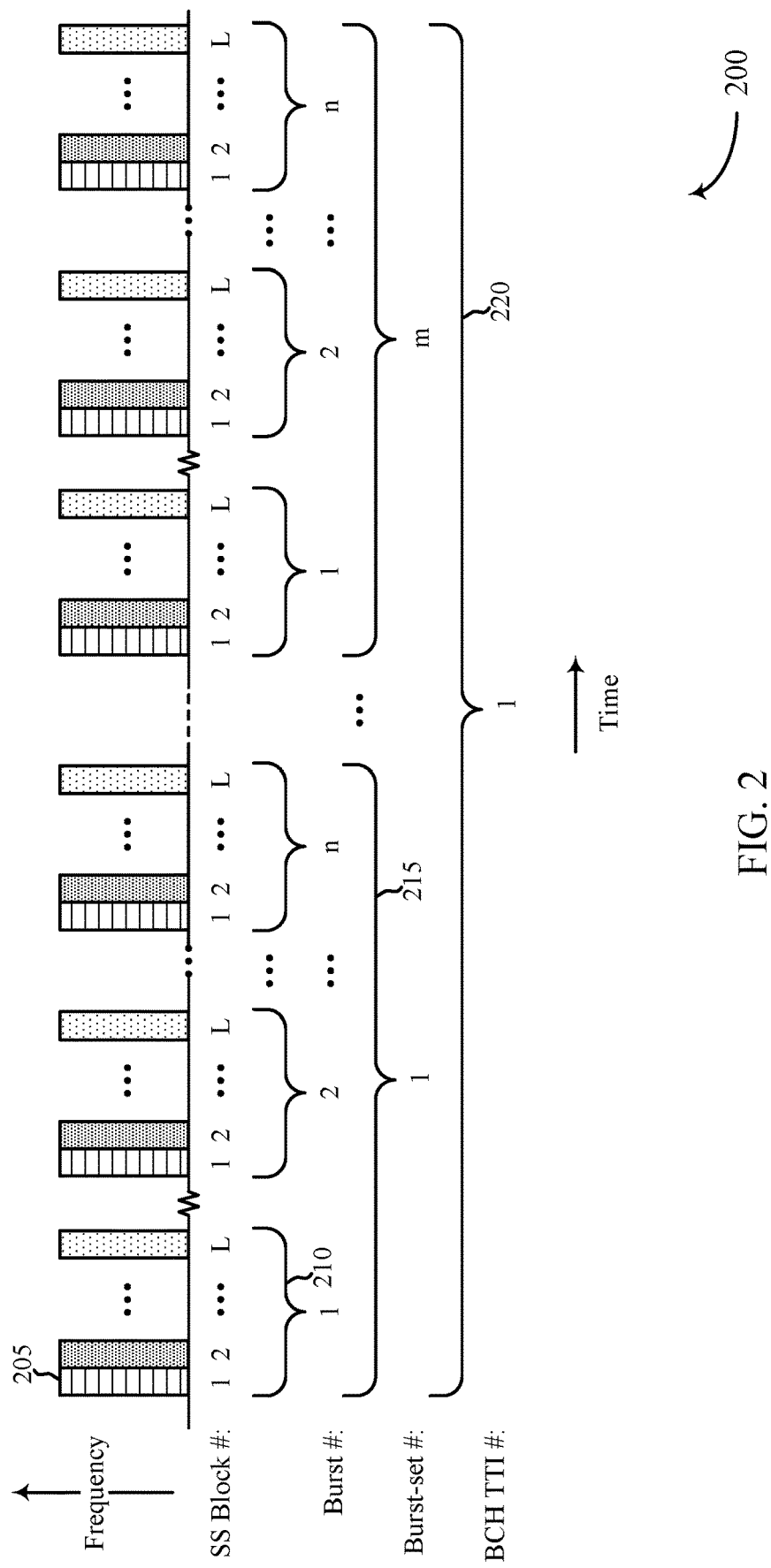
FIG. 2 shows an example timeline of synchronization signal (SS) blocks within a periodic broadcast channel transmission time interval (BCH TTI), in accordance with various aspects of the present disclosure.

FIG. 2 shows an example timeline 200 of SS blocks 205 within a periodic BCH TTI, in accordance with various aspects of the present disclosure. The SS blocks 205 may be transmitted by a base station, which may be an example of aspects of one or more of the base stations 105 described with reference to FIG. 1. A UE may receive one or more of the SS blocks 205. The UE may be an example of aspects of one or more of the UEs 115 described with reference to FIG. 1.

An SS block burst 210 may include L SS blocks 205, with L≥1, and with the SS blocks 205 being transmitted in succession when L>1 (as shown). In some examples, the SS blocks 205 within an SS block burst 210 may be transmitted on different beams using a beam sweep. In other examples, the SS blocks 205 within an SS block burst 210 may be transmitted on a same beam or in an omnidirectional manner. In some examples, an SS block 205 may include a PBCH and one or more of a PSS and an SSS. The payload of the PBCH may include an SS block index or other timing information. Alternatively, the SS block index may be implicitly included in the PBCH (e.g., conveyed by a PBCH redundancy version (RV) number). An SS block index may indicate a timing of an SS block 205 within a sequence of SS blocks 205 (e.g., a timing of an SS block 205 within an SS block burst 210). An SS block index may thus also indicate a timing of an SS block 205 within an SS block burst-set 215 and within a BCH TTI 220 (although in some cases, other timing information may need to be combined with the timing indicated by an SS block index to fully determine a timing of an SS block 205 within an SS block burst-set 215 or BCH TTI 220). In some examples, an SS block index may also indicate a beam on which an SS block 205 is transmitted (e.g., an SS block index may convey a beam index). In some examples, the SSS of an SS block 205 may be based at least in part on a physical cell index (PCI) of the base station that transmitted the SS block 205.

A plurality of SS blocks bursts 210 may be transmitted within an SS block burst-set 215. In some examples, the SS block bursts 210 in an SS block burst-set 215 may be associated with different PBCH RVs. In some cases, an SS block burst-set 215 may include n SS block bursts 210. The SS block bursts 210 within an SS block burst-set 215 may be separated in time.

A plurality of SS block burst-sets 215 may be transmitted within the BCH TTI 220. For purposes of this disclosure, a BCH TTI is defined to include any time interval in which a plurality of SS blocks are transmitted with the same system information, regardless of whether the SS blocks are allocated to SS block bursts 210 or SS block burst-sets 215. In some examples, the SS block burst-sets 215 in a BCH TTI 220 may be associated with different SSSs. In some cases, a BCH TTI 220 may include m SS block burst-sets 215 (e.g., m=4 SS block burst sets, with the SS block burst sets having a periodicity of 20 ms, and the BCH TTI 220 having a periodicity of 80 ms).

When m=2, n=4, and L=14, the number of SS blocks 205 transmitted within the BCH TTI 220 may be 112 (e.g., (m)(n)(L)=112). In other examples, the values of m, n, and L may be higher or lower. Regardless, a UE that receives one of the SS blocks 205 may need to determine the timing of the SS block 205 within an SS block burst 210, an SS block burst-set 215, and/or a BCH TTI 220.

Figure 3:
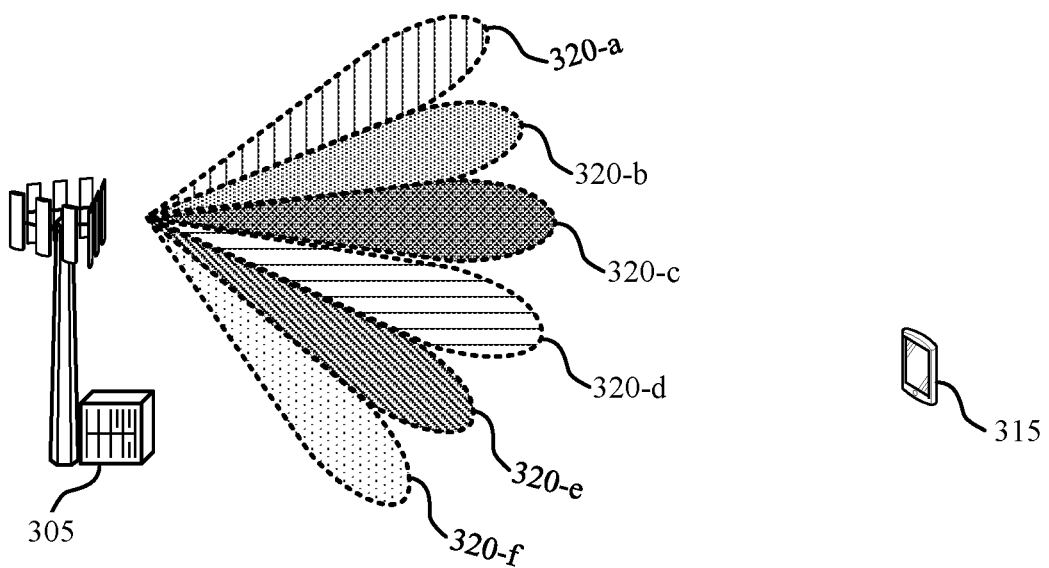
FIG. 3 shows an example of a mmW wireless communication system, in accordance with various aspects of the present disclosure.

FIG. 3 shows an example of a mmW wireless communication system 300, in accordance with various aspects of the present disclosure. The mmW wireless communication system 300 may include a base station 305 and a UE 315, which may be examples of aspects of one or more of the base stations 105 or UEs 115 described with reference to FIG. 1.

To overcome signal attenuation and path losses at mmW frequencies, the base station 305 and UE 315 may communicate with one another on one or more beams (i.e., directional beams). As shown, the base station 305 may transmit signals on a plurality of beams 320 (e.g., on different directional beams 320, including, for example, a first beam 320-a, a second beam 320-b, a third beam 320-c, a fourth beam 320-d, a fifth beam 320-e, and a sixth beam 320-f). In other examples, the base station 305 may transmit on more or fewer beams 320.

In some examples, the base station 305 may transmit an SS block on each of the beams 320, and the UE 315 may receive the SS block on one or more of the beams 320. The UE 315 may determine the timing of an SS block, and a beam 320 on which the SS block is received, to acquire a network to which the base station 305 provides access. In some examples, the UE 315 may determine the timing of the SS block and/or identify the beam 320 on which the SS block is received after receiving and combining decoding metrics for two or more SS blocks.

A mobile UE may connect to a base station, and while connected to the base station may perform cell measurements on signals transmitted by the base station to which the UE is connected (e.g., on signals transmitted by a serving cell) and signals transmitted by other base stations to which the UE may be handed over (e.g., on signals transmitted by neighboring cells). In some examples, the transmitted signals on which the cell measurements are performed may include SS blocks. When SS blocks are transmitted on beams, a UE may identify a beam on which an SS block is transmitted by identifying a beam index associated with the SS block. In some cases, a PBCH included in the SS block may need to be decoded to obtain the beam index associated with the SS block.

Figure 4:
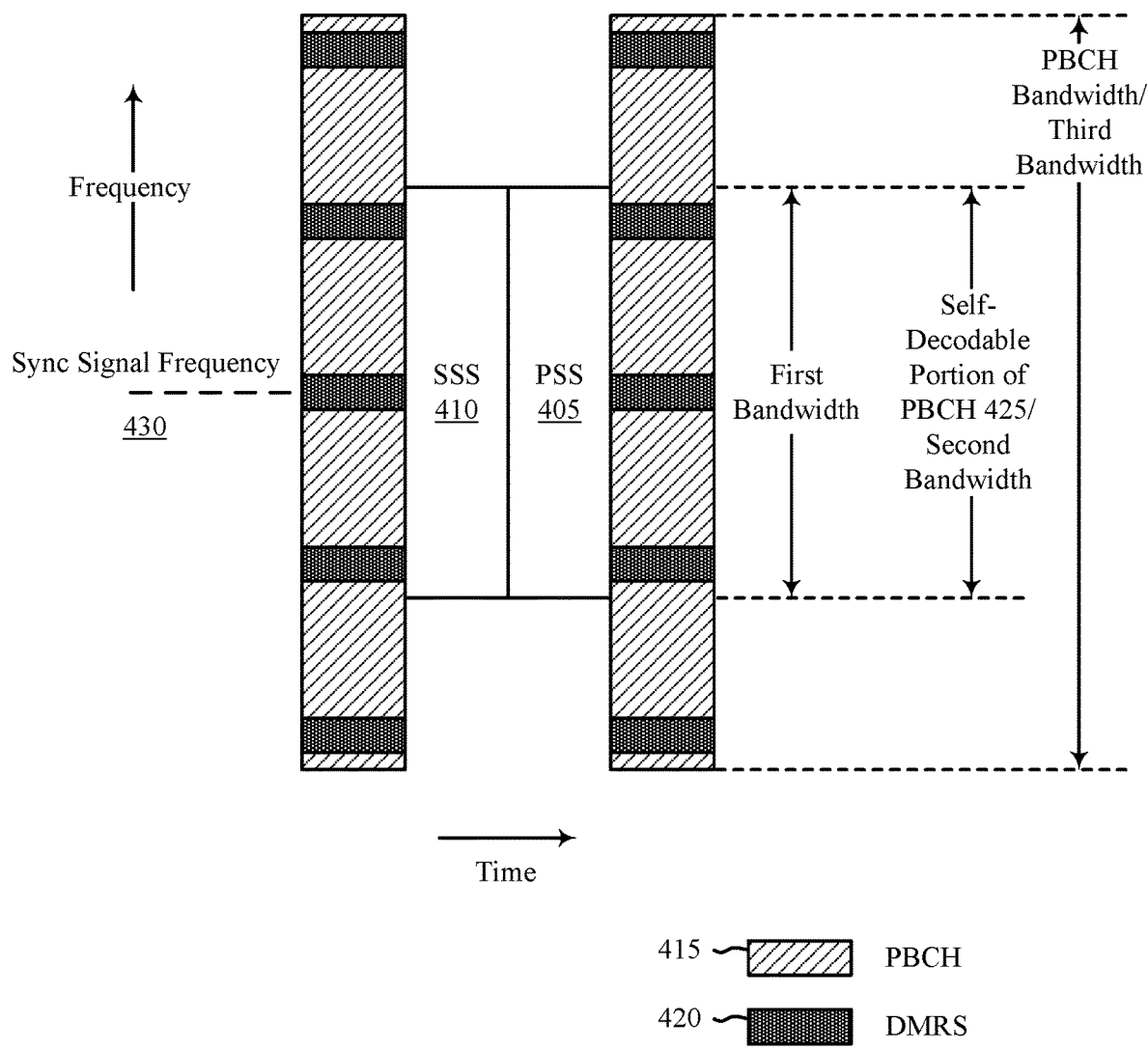
FIG. 4 shows an SS block including a set of synchronization signals and a physical broadcast channel (PBCH), in accordance with various aspects of the present disclosure.

FIG. 4 shows an SS block 400 including a set of synchronization signals and a PBCH, in accordance with various aspects of the present disclosure. In some examples, the SS block 400 may be transmitted by one of the base stations described with reference to FIGS. 1 and 3 and/or received by one of the UEs described with reference to FIGS. 1 and 3.

The SS block 400 may include a PSS 405, an SSS 410, and a PBCH 515. The PSS 405, SSS 410, and PBCH 415 may be time division multiplexed such that a first portion of the PBCH 415 is transmitted in one or more symbols, then the SSS 410, then the PSS 405, and then a second portion of the PBCH 415. The PSS 405 and SSS 410 may be transmitted within a first bandwidth, and the PBCH 415 may be transmitted within a third bandwidth that is greater than the first bandwidth. The third bandwidth may be referred to as the PBCH bandwidth. As shown, the PBCH 415 may have a self-decodable portion 425. The self-decodable portion 425 of the PBCH 415 may have a second bandwidth that is substantially within the first bandwidth occupied by the PSS 405 and SSS 410 (with the second bandwidth being equal to the first bandwidth in some cases). In some examples, the first and second bandwidths may include 127 tones, and the third bandwidth may include 288 tones. Thus, there may be a portion of the PBCH that occupies an bandwidth outside of the self-decodable portion 425 and within the PBCH bandwidth.

In some examples, a UE may use a timing of the PSS 405 and/or SSS 410 (and a physical cell ID included in the SSS 410) to decode the PBCH 415. A UE may also or alternatively decode the PBCH 415 based at least in part on a demodulation reference signal (DMRS) 420 transmitted in a same symbol (or periods) as the PBCH 415 (i.e., the DMRS 420 may be frequency division multiplexed with the PBCH 415).

To receive the SS block 400, a UE may typically tune a receiver of the UE to a wider bandwidth (e.g., at least the third bandwidth) to receive the PBCH 415, and to a narrower bandwidth (e.g., at least the first bandwidth) to receive the PSS 405 and SSS 410. Such a retuning may not be efficient, and in the case of a narrower band UE may not be possible (e.g., some UEs may only be capable of receiving the first bandwidth, or a bandwidth that is smaller than the third bandwidth). However, retuning may be avoided when a UE is at a good geometry within the coverage area of the base station that transmitted the SS block 400, and when the PBCH 415 includes the self-decodable portion 425. A "self-decodable portion of a PBCH" is defined to be a portion of a PBCH that is decodable without reliance on other portions of the PBCH (i.e., those portions that are outside the second bandwidth).

In some cases, a base station that transmits the SS block 400 may transmit an indication that the SS block 400 includes the self-decodable portion 425 of the PBCH 415. In some examples, the indication may be signaled in the PSS 405 and/or SSS 410. For example, assuming that the PSS 405 and SSS 410 are transmitted from the same antenna port, the indication that the SS block 400 includes the self-decodable portion 425 of the PBCH 415 may be encoded in a difference between the PSS and the SSS (e.g., the base station may transmit a +S to indicate inclusion of the self-decodable portion 425 in the PBCH 415, and a −S to indicate an absence of the self-decodable portion 425, where S=PSS or SSS and a UE detects a +1 or a −1 based on the PSS and the SSS).

In some cases the location of the PSS 405 and SSS 410, and thus the self-decodable portion 425 of the PBCH 415, may be fixed within a system bandwidth. In other cases, the location of the PSS 405 and SSS 410, and thus the self-decodable portion 425 of the PBCH 415, may float within a system bandwidth, and may depend on the location of a sync signal frequency 430, which sync signal frequency 430 may be indicated by the base station that transmits the SS block 400. The base station may also indicate the bandwidth of the PSS 405, SSS 410, or self-decodable portion 425 of the PBCH 415. In some cases, a portion of a PBCH may be self-decodable, by a UE, for some sync signal frequencies, but not other sync signal frequencies.

Figure 5:
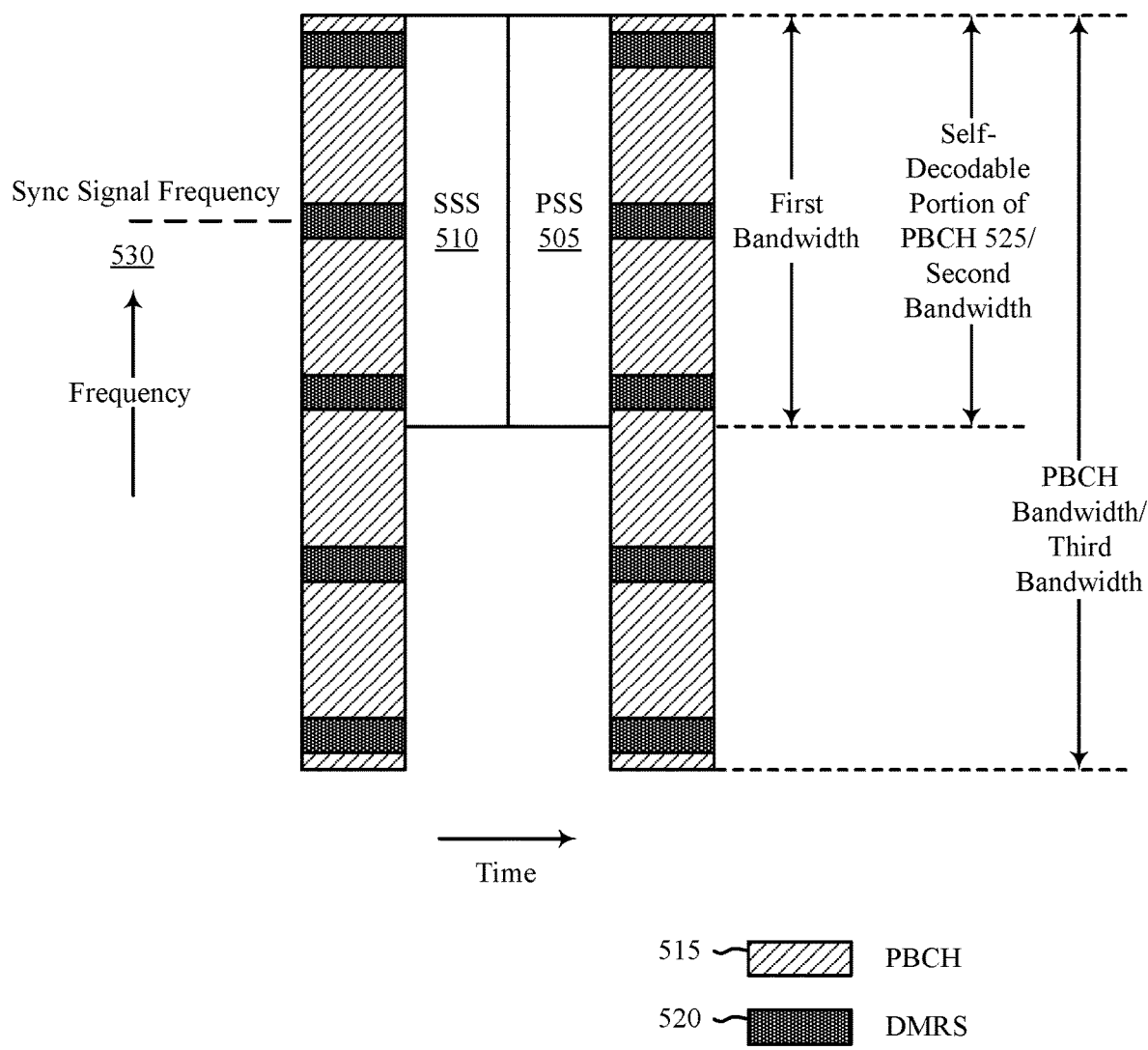
FIG. 5 shows an SS block including a set of synchronization signals and a PBCH, in accordance with various aspects of the present disclosure.

FIG. 5 shows an SS block 500 including a set of synchronization signals and a PBCH, in accordance with various aspects of the present disclosure. In some examples, the SS block 500 may be transmitted by one of the base stations described with reference to FIGS. 1 and 3 and/or received by one of the UEs described with reference to FIGS. 1 and 3.

The SS block 500 may include a PSS 505, an SSS 510, and a PBCH 515. The PSS 505, SSS 510, and PBCH 515 may be time division multiplexed such that a first portion of the PBCH 515 is transmitted in one or more symbols, then the SSS 510, then the PSS 505, and then a second portion of the PBCH 515. The PSS 505 and SSS 510 may be transmitted within a first bandwidth, and the PBCH 515 may be transmitted within a third bandwidth that is greater than the first bandwidth. The third bandwidth may also be referred to as the PBCH bandwidth. As shown, the PBCH 515 may have a self-decodable portion 525. The self-decodable portion 525 of the PBCH 515 may have a second bandwidth that is substantially within the first bandwidth occupied by the PSS 505 and SSS 510 (with the second bandwidth being equal to the first bandwidth in some cases). In some examples, the first and second bandwidths may include 127 tones, and the third bandwidth may include 288 tones. Thus, there may be a portion of the PBCH that occupies an bandwidth outside of the self-decodable portion 425 and within the PBCH bandwidth.

In some examples, a UE may use a timing of the PSS 505 and/or SSS 510 (and a physical cell ID included in the SSS 510) to decode the PBCH 515. A UE may also or alternatively decode the PBCH 515 based at least in part on a DMRS 520 transmitted in a same symbol (or periods) as the PBCH 515 (i.e., the DMRS 520 may be frequency division multiplexed with the PBCH 515).

To receive the SS block 500, a UE may typically tune a receiver of the UE to a wider bandwidth (e.g., at least the third bandwidth) to receive the PBCH 515, and to a narrower bandwidth (e.g., at least the first bandwidth) to receive the PSS 505 and SSS 510. Such a retuning may not be efficient, and in the case of a narrower band UE may not be possible (e.g., some UEs may only be capable of receiving the first bandwidth, or a bandwidth that is smaller than the third bandwidth). However, retuning may be avoided when a UE is at a good geometry within the coverage area of the base station that transmitted the SS block 500, and when the PBCH 515 includes the self-decodable portion 525. A "self-decodable portion of a PBCH" is defined to be a portion of a PBCH that is decodable without reliance on other portions of the PBCH (i.e., those portions that are outside the second bandwidth).

In some cases, a base station that transmits the SS block 500 may transmit an indication that the SS block 500 includes the self-decodable portion 525 of the PBCH 515. In some examples, the indication may be signaled in the PSS 505 and/or SSS 510. For example, assuming that the PSS 505 and SSS 510 are transmitted from the same antenna port, the indication that the SS block 500 includes the self-decodable portion 525 of the PBCH 515 may be encoded in a difference between the PSS and the SSS (e.g., the base station may transmit a +S to indicate inclusion of the self-decodable portion 525 in the PBCH 515, and a −S to indicate an absence of the self-decodable portion 525, where S=PSS or SSS and a UE detects a +1 or a −1 based on the PSS and the SSS).

In some cases the location of the PSS 505 and SSS 510, and thus the self-decodable portion 525 of the PBCH 515, may be fixed within a system bandwidth. In other cases, the location of the PSS 505 and SSS 510, and thus the self-decodable portion 525 of the PBCH 515, may float within a system bandwidth, and may depend on the location of a sync signal frequency 530, which sync signal frequency 530 may be indicated by the base station that transmits the SS block 500. The base station may also indicate the bandwidth of the PSS 505, SSS 510, or self-decodable portion 525 of the PBCH 515. In some cases, a portion of a PBCH may be self-decodable, by a UE, for some sync signal frequencies, but not other sync signal frequencies. In contrast to the sync signal frequency 430 described with reference to FIG. 4, the sync signal frequency 530 may be a higher frequency, and may be offset from a center frequency of the system bandwidth (or third bandwidth).

A base station may format a self-decodable portion of a PBCH (e.g., the self-decodable portion 425 described with reference to FIG. 4, or the self-decodable portion 525 described with reference to FIG. 5) to be self-decodable in various ways. For example, a base station may polar-encode bits of the PBCH and randomly interleave the polar-encoded bits of the PBCH within a self-decodable bandwidth of the PBCH (e.g., a PSS/SSS bandwidth) using, for example, a known random permutation. In some examples, interleaving the polar-encoded bits of the PBCH may include S-random interleaving the polar-encoded bits of the PBCH. An S-random interleaver may interleave bits in accordance with a known random permutation, with a constraint that no input symbols within a distance S appear within the distance S at an output of the interleaver). In some examples, interleaving the polar-encoded bits of the PBCH may include use of a triangular interleaver, a convolutional interleaver, or a rectangular interleaver and its variations (e.g., Parallel-rectangular interleaver, etc.). Other types of interleavers may be used.

In some examples, bits of a PBCH may be polar-encoded, and higher capacity polar-encoded bits of the PBCH may be mapped to a self-decodable bandwidth of the PBCH (e.g., a PSS/SSS bandwidth).

In some examples, bits of a PBCH may be LDPC-encoded, and at least LDPC-encoded bits of the PBCH that are associated with a self-decodable core of an LDPC graph may be mapped to a self-decodable bandwidth of the PBCH (e.g., a PSS/SSS bandwidth). The self-decodable core of the LDPC graph may include systematic bits and degree-2 parity bits, and in some examples may contain degree-1 parity nodes, or other parity nodes. However, the self-decodable core of the LDPC graph may not contain just degree-1 nodes. A degree-k node is a variable node with degree of k in an LDPC graph.

In some examples, bits of a PBCH may be polar-encoded, LDPC-encoded, or TBCC-encoded, and encoded bits representing all PBCH information may be mapped to a self-decodable bandwidth of the PBCH (e.g., a PSS/SSS bandwidth). In some of these examples, encoded bits representing repeated PBCH information may also be mapped to the second bandwidth and/or encoded bits representing repeated PBCH information may also be mapped to a portion of the third bandwidth outside the second bandwidth.

Figure 6:
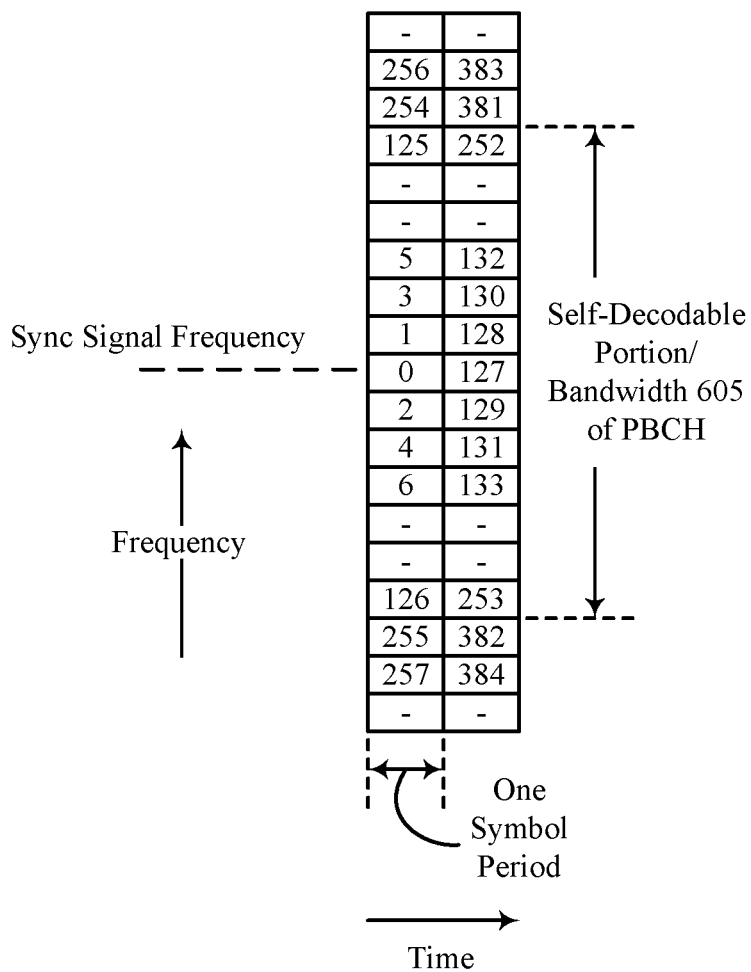
FIG. 6 shows a tone mapping for a PBCH transmitted in an SS block, in accordance with various aspects of the present disclosure.

FIG. 6 shows a tone mapping 600 for a PBCH transmitted in an SS block, in accordance with various aspects of the present disclosure. In accordance with the tone mapping 600, a PBCH may be mapped first to tones in a self-decodable bandwidth 605 (e.g., a PSS/SSS bandwidth), and then to tones outside the self-decodable bandwidth 605. Within the self-decodable bandwidth 605, the PBCH may be mapped to tones about a sync signal frequency (or DC carrier), with the PBCH being mapped to tones alternating about the sync signal frequency until the PBCH is mapped to all tones in the self-decodable bandwidth 605. The PBCH may then be mapped to tones outside the self-decodable bandwidth 605 in a similar or different manner. When the PBCH is transmitted in multiple symbol periods, the PBCH may be mapped to tones in the self-decodable bandwidth 605 of each symbol period first, and then to tones outside the self-decodable bandwidth 605.

Figure 7:
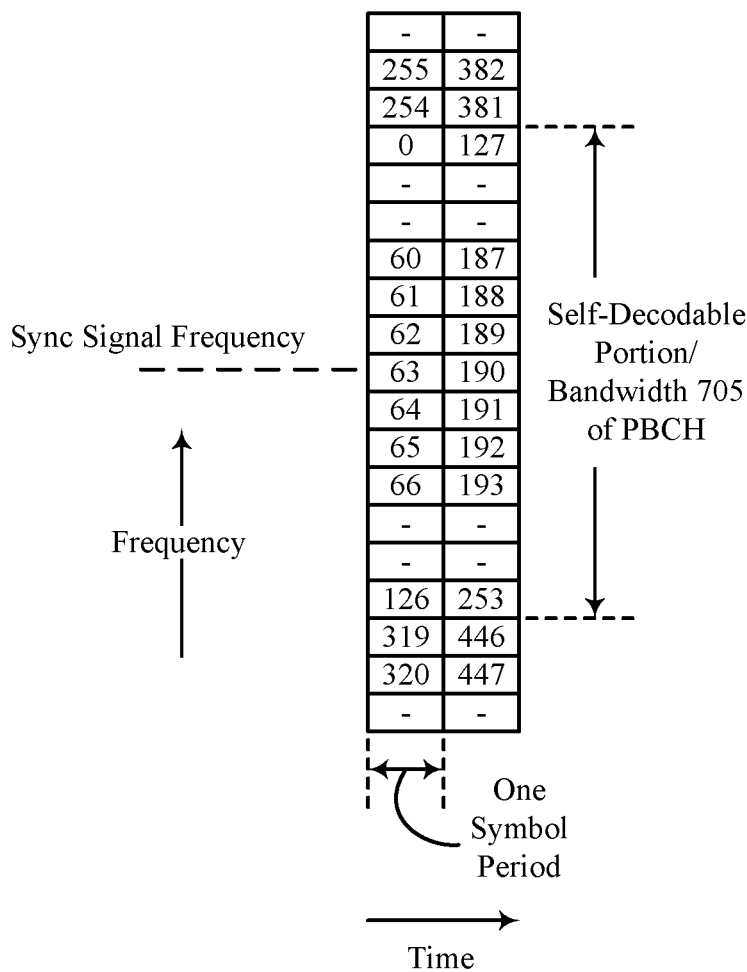
FIG. 7 shows a tone mapping for a PBCH transmitted in an SS block, in accordance with various aspects of the present disclosure.

FIG. 7 shows a tone mapping 700 for a PBCH transmitted in an SS block, in accordance with various aspects of the present disclosure. In accordance with the tone mapping 700, a PBCH may be mapped first to tones in a self-decodable bandwidth 705 (e.g., a PSS/SSS bandwidth), and then to tones outside the self-decodable bandwidth 705. Within the self-decodable bandwidth 705, the PBCH may be mapped to tones sequentially, beginning at one end of the self-decodable bandwidth 705, until the PBCH is mapped to all tones in the self-decodable bandwidth 705. The PBCH may then be mapped to tones outside the self-decodable bandwidth 705 in a similar or different manner. When the PBCH is transmitted in multiple symbol periods, the PBCH may be mapped to tones in the self-decodable bandwidth 605 of each symbol period first, and then to tones outside the self-decodable bandwidth 605.

When a PBCH is transmitted across two or more symbols (e.g., orthogonal frequency-division multiplexed (OFDM) symbols), and in some examples, the PBCH may be rate matched to both the first symbol and the second symbol. In other examples, the PBCH may be rate matched to the first symbol and repeated in the second symbol. In some examples, the PBCH may be associated with a quasi-random phase shift in each of a plurality of resource elements. The quasi-random phase shift may depend on a physical cell ID (PCID), and may help to randomize interference in case of synchronous network interference.

Figure 8:
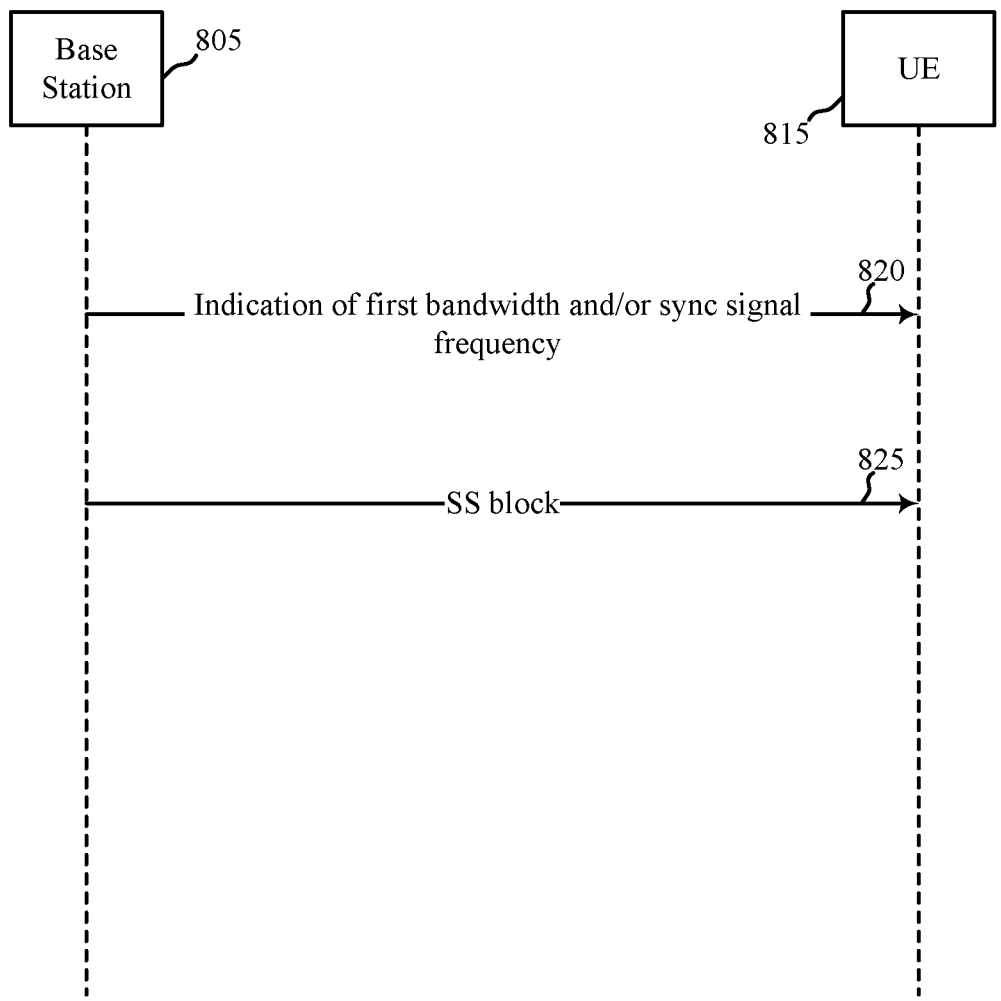
FIG. 8 shows an example message flow between a base station and a user equipment (UE), in accordance with various aspects of the present disclosure.

FIG. 8 shows an example message flow 800 between a base station 805 and a UE 815, in accordance with various aspects of the present disclosure. The base station 805 and UE 815 may be examples of aspects of the base stations and UEs described with reference to FIGS. 1 and 3.

At 820, the base station 805 may transmit, to the UE 815 or in a broadcast transmission received by the UE 815, a first indication of a first bandwidth, a second indication of a sync signal frequency, or a combination thereof.

At 825, the base station 805 may transmit an SS block. The SS block may include at least one synchronization signal having a first bandwidth. In some examples, the at least one synchronization signal may include at least one of a PSS, an SSS, or a combination thereof. The SS block may also include a PBCH. The PBCH may occupy a third bandwidth that is greater than the first bandwidth, and may include a self-decodable portion transmitted within a second bandwidth that is substantially within the first bandwidth of the at least one synchronization signal. In some examples, bits of the PBCH may be encoded and mapped to the second bandwidth or the third bandwidth. In some examples, the PBCH may be mapped to tones in at least the second bandwidth using a tone mapping that begins within the second bandwidth and alternates about a sync signal frequency within at least the second bandwidth. In some examples, the PBCH may be mapped to tones in the second bandwidth using a tone mapping that begins within the second bandwidth and is sequential within the second bandwidth. In some examples, the PBCH may be transmitted in at least a first symbol and a second symbol, and may be rate matched to both the first symbol and the second symbol. In some examples, the PBCH may be transmitted in at least a first symbol and a second symbol, and may be rate matched to the first symbol and repeated in the second symbol. In some examples, the PBCH may be associated with a quasi-random phase shift in each of a plurality of resource elements.

In some examples, the base station 805 may transmit an indication that the SS block includes the self-decodable portion of the PBCH. In some examples, transmitting the indication may include signaling the indication in the at least one synchronization signal. In some examples, the at least one synchronization signal may include a PSS and an SSS transmitted from a same antenna port of the base station, and signaling the indication in the at least one synchronization signal may include encoding the indication in a difference between the PSS and the SSS.

In some examples, the base station 805 may polar-encode bits of the PBCH and randomly interleave the polar-encoded bits of the PBCH within a self-decodable bandwidth of the PBCH (e.g., a PSS/SSS bandwidth) using, for example, a known random permutation. In some examples, interleaving the polar-encoded bits of the PBCH may include S-random interleaving the polar-encoded bits of the PBCH. An S-random interleaver may interleave bits in accordance with a known random permutation, with a constraint that no input symbols within a distance S appear within the distance S at an output of the interleaver). In some examples, interleaving the polar-encoded bits of the PBCH may include use of any type of interleaver, including use of a triangular interleaver, a convolutional interleaver, or a rectangular interleaver and its variations (e.g., Parallel-rectangular interleaver, etc.).

In some examples, the base station 805 may polar-encode bits of the PBCH and map higher capacity polar-encoded bits of the PBCH to a self-decodable bandwidth of the PBCH (e.g., a PSS/SSS bandwidth).

In some examples, the base station 805 may LDPC-encode bits of the PBCH, and at least LDPC-encoded bits of the PBCH that are associated with a self-decodable core of an LDPC graph may be mapped to a self-decodable bandwidth of the PBCH (e.g., a PSS/SSS bandwidth).

In some examples, the base station 805 may polar-encode, LDPC-encode, or TBCC-encode bits of the PBCH, and map encoded bits representing all PBCH information to a self-decodable bandwidth of the PBCH (e.g., a PSS/SSS bandwidth). In some of these examples, encoded bits representing repeated PBCH information may also be mapped to the second bandwidth and/or encoded bits representing repeated PBCH information may also be mapped to a portion of the third bandwidth outside the second bandwidth.

Figure 9:
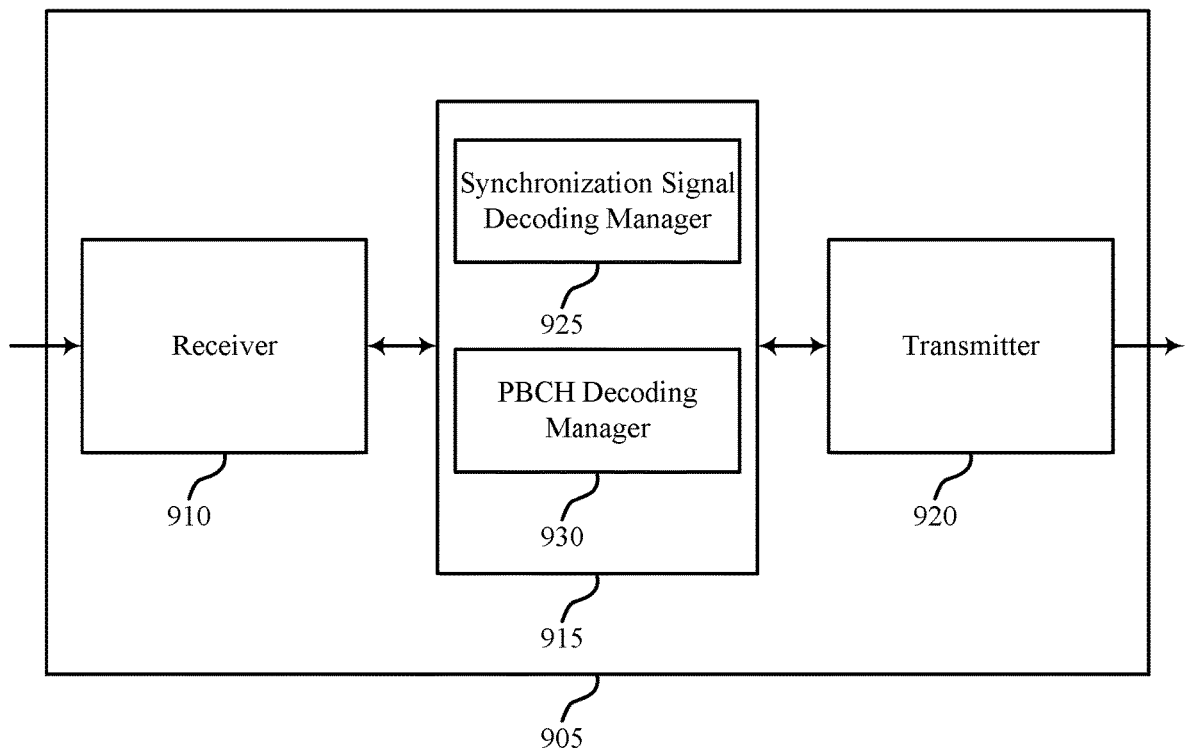
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of one or more of the UEs described with reference to FIGS. 1, 3, and 8. The apparatus 905 may include a receiver 910, a UE wireless communication manager 915, and a transmitter 920. The apparatus 905 may also include a processor. Each of these components may be in communication with one another (e.g., via one or more buses).

The receiver 910 may receive data or control signals or information (i.e., transmissions), some or all of which may be associated with various information channels (e.g., data channels, control channels, etc.). Received signals or information, or measurements performed thereon, may be passed to other components of the apparatus 905. The receiver 910 may include one or a plurality of antennas.

The transmitter 920 may transmit data or control signals or information (i.e., transmissions) generated by other components of the apparatus 905, some or all of which may be associated with various information channels (e.g., data channels, control channels, etc.). In some examples, the transmitter 920 may be collocated with the receiver 910 in a transceiver. For example, the transmitter 920 and receiver 910 may be an example of aspects of the transceiver(s) 1330 described with reference to FIG. 13. The transmitter 920 may include one or a plurality of antennas, which may be separate from (or shared with) the one or more antennas used by the receiver 910.

The UE wireless communication manager 915 and/or at least some of its various sub-components may be implemented in hardware, software executed by a processor, firmware, or any combination thereof. If implemented in software executed by a processor, the functions of the UE wireless communication manager 915 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE wireless communication manager 915 and/or at least some of its various sub-components may be physically located at various positions, including being distributed such that portions of functions are implemented at different physical locations by one or more physical devices. In some examples, the UE wireless communication manager 915 and/or at least some of its various sub-components may be a separate and distinct component in accordance with various aspects of the present disclosure. In other examples, the UE wireless communication manager 915 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The UE wireless communication manager 915 may include a synchronization signal decoding manager 925 and a PBCH decoding manager 930.

The synchronization signal decoding manager 925 may be used to receive a synchronization signal within an SS block. The synchronization signal may have a first bandwidth. In some examples, the at least one synchronization signal may include at least one of a PSS, an SSS, or a combination thereof.

The PBCH decoding manager 930 may be used to receive a self-decodable portion of a PBCH of the SS block. The self-decodable portion of the PBCH may have a second bandwidth substantially within the first bandwidth. The PBCH may have a third bandwidth that is greater than the first bandwidth. In some examples, the self-decodable portion of the PBCH may be received in at least a first symbol and a second symbol, and may be rate matched to both the first symbol and the second symbol. In some examples, the PBCH may occupy at least a first symbol and a second symbol, and may be rate matched to the first symbol and repeated in the second symbol. In some examples, the PBCH may be associated with a quasi-random phase shift in each of a plurality of resource elements.

The PBCH decoding manager 930 may also be used to decode the PBCH based on the self-decodable portion of the PBCH. In some examples, the PBCH may be decoded based on a tone mapping that begins within the second bandwidth and alternates about a sync signal frequency within at least the second bandwidth. In some examples, the PBCH may be decoded based on a tone mapping that begins within the second bandwidth and is sequential within the second bandwidth.

Figure 10:
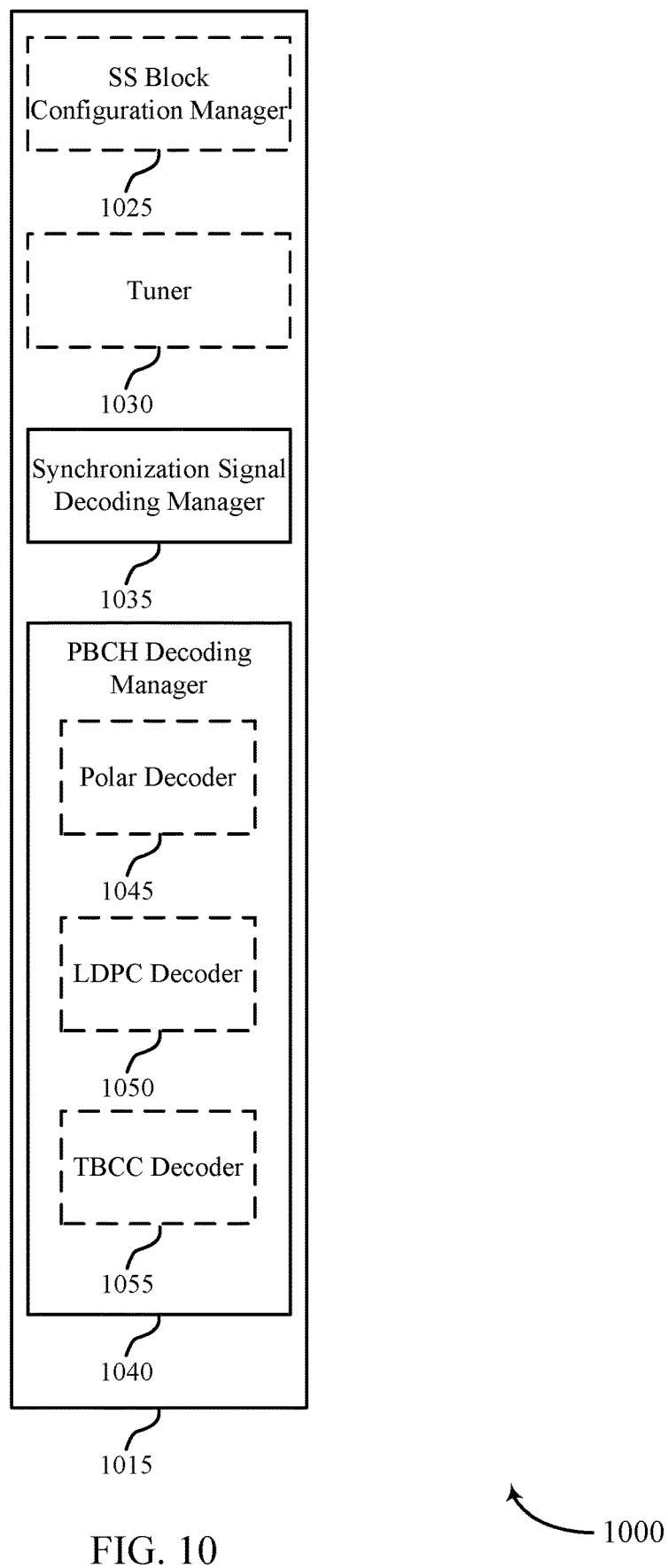
FIG. 10 shows a block diagram of a UE wireless communication manager, in accordance with various aspects of the present disclosure.

FIG. 10 shows a block diagram 1000 of a UE wireless communication manager 1015, in accordance with various aspects of the present disclosure. The UE wireless communication manager 1015 may be an example of aspects of the UE wireless communication manager 915 described with reference to FIG. 9. The UE wireless communication manager 1015 may include an optional SS block configuration manager 1025, an optional tuner 1030, a synchronization signal decoding manager 1035, and a PBCH decoding manager 1040. The PBCH decoding manager 1040 may include an optional polar decoder 1045, an optional LDPC decoder 1050, or an optional TBCC decoder 1055. Each of these components may communicate, directly or indirectly, with one another (e.g., via one or more buses). The synchronization signal decoding manager 1035 and PBCH decoding manager 1040 may be examples of the synchronization signal decoding manager 925 and PBCH decoding manager 930 described with reference to FIG. 9.

The SS block configuration manager 1025 may be used to receive, from a base station, at least one of a first indication of a first bandwidth, a second indication of a sync signal frequency, or a combination thereof.

The tuner 1030 may be used to tune a receiver of a UE that includes the UE wireless communication manager 1015 to the first bandwidth.

The synchronization signal decoding manager 1035 may be used to receive a synchronization signal within an SS block. The synchronization signal may have the first bandwidth. In some examples, the at least one synchronization signal may include at least one of a PSS, an SSS, or a combination thereof.

The PBCH decoding manager 1040 may be used to receive a self-decodable portion of a PBCH of the SS block. The self-decodable portion of the PBCH may have a second bandwidth substantially within the first bandwidth. The PBCH may have a third bandwidth that is greater than the first bandwidth. In some examples, the self-decodable portion of the PBCH may be received in at least a first symbol and a second symbol, and may be rate matched to both the first symbol and the second symbol. In some examples, the PBCH may occupy at least a first symbol and a second symbol, and may be rate matched to the first symbol and repeated in the second symbol. In some examples, the PBCH may be associated with a quasi-random phase shift in each of a plurality of resource elements.

The PBCH decoding manager 1040 may also be used to decode the PBCH based on the self-decodable portion of the PBCH. In some examples, the PBCH may be decoded based on a tone mapping that begins within the second bandwidth and alternates about a sync signal frequency within at least the second bandwidth. In some examples, the PBCH may be decoded based on a tone mapping that begins within the second bandwidth and is sequential within the second bandwidth.

In some examples, the SS block configuration manager 1025 may also or alternatively be used to receive, from a base station, an indication that the SS block includes the self-decodable portion of the PBCH. In some examples, the indication may be signaled in the at least one synchronization signal. In some examples, the at least one synchronization signal may include a PSS and an SSS transmitted from a same antenna port of the base station, and receiving the indication that the SS block includes the self-decodable portion of the PBCH may include detecting a difference between the PSS and the SSS.

In some examples, received bits of the PBCH may be polar-encoded and randomly interleaved, and the polar decoder 1045 may be used to perform a polar decode of the PBCH based on a set of polar-encoded bits of the PBCH included in the self-decodable portion of the PBCH. In some examples, the received bits of the PBCH may be S-random interleaved. In some examples, interleaving the polar-encoded bits of the PBCH may include use of any type of interleaver, including use of a triangular interleaver, a convolutional interleaver, or a rectangular interleaver and its variations (e.g., Parallel-rectangular interleaver, etc.).

In some examples, received bits of the PBCH may be polar-encoded, and the polar decoder 1045 may characterize bits of the PBCH associated with tones outside the first bandwidth as punctured bits of a polar code.

In some examples, received bits of the PBCH may be LDPC-encoded, and the LDPC decoder 1050 may be used to map a set of bits of the PBCH, included in the self-decodable portion of the PBCH, to at least a self-decodable core of an LDPC graph.

In some examples, received bits of the PBCH may be polar-encoded, LDPC-encoded, or TBCC-encoded, and encoded bits of the PBCH included in the self-decodable portion of the PBCH may include all PBCH information. In these examples, the polar decoder 1045, LDPC decoder 1050, or TBCC decoder 1055 may be used to decode the PBCH based on the self-decodable portion of the PBCH. In some of these examples, encoded bits of the PBCH included in the self-decodable portion of the PBCH may include repeated PBCH information and/or encoded bits of the PBCH outside the self-decodable portion of the PBCH may include repeated PBCH information.

Figure 11:
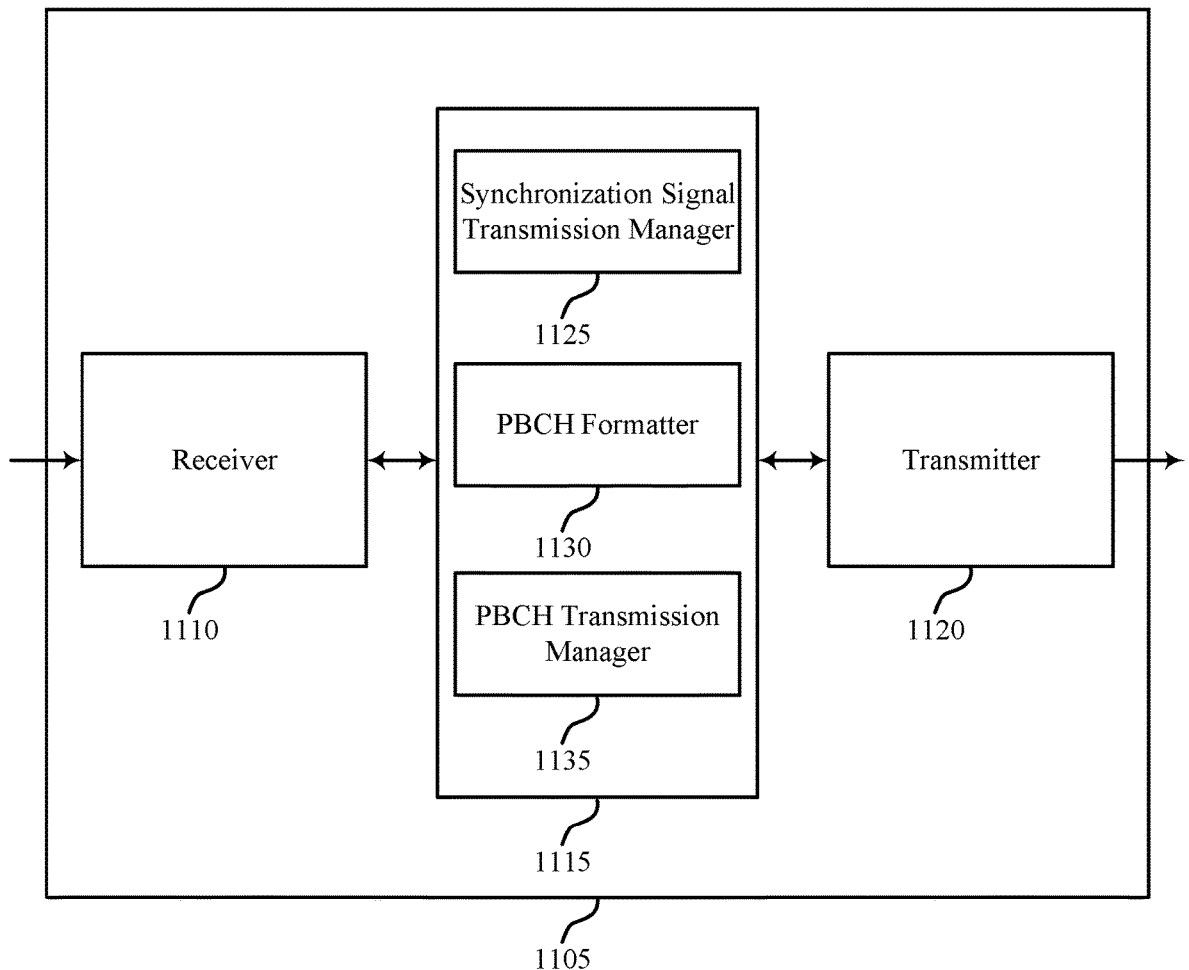
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. The apparatus 1105 may be an example of aspects of one or more of the base stations described with reference to FIGS. 1, 3, and 8. The apparatus 1105 may include a receiver 1110, a base station wireless communication manager 1115, and a transmitter 1120. The apparatus 1105 may also include a processor. Each of these components may be in communication with one another (e.g., via one or more buses).

The receiver 1110 may receive data or control signals or information (i.e., transmissions), some or all of which may be associated with various information channels (e.g., data channels, control channels, etc.). Received signals or information, or measurements performed thereon, may be passed to other components of the apparatus 1105. The receiver 1110 may include one or a plurality of antennas.

The transmitter 1120 may transmit data or control signals or information (i.e., transmissions) generated by other components of the apparatus 1105, some or all of which may be associated with various information channels (e.g., data channels, control channels, etc.). In some examples, the transmitter 1120 may be collocated with the receiver 1110 in a transceiver. For example, the transmitter 1120 and receiver 1110 may be an example of aspects of the transceiver(s) 1450 described with reference to FIG. 14. The transmitter 1120 may include one or a plurality of antennas, which may be separate from (or shared with) the one or more antennas used by the receiver 1110.

The base station wireless communication manager 1115 and/or at least some of its various sub-components may be implemented in hardware, software executed by a processor, firmware, or any combination thereof. If implemented in software executed by a processor, the functions of the base station wireless communication manager 1115 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station wireless communication manager 1115 and/or at least some of its various sub-components may be physically located at various positions, including being distributed such that portions of functions are implemented at different physical locations by one or more physical devices. In some examples, the base station wireless communication manager 1115 and/or at least some of its various sub-components may be a separate and distinct component in accordance with various aspects of the present disclosure. In other examples, the base station wireless communication manager 1115 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The base station wireless communication manager 1115 may include a synchronization signal transmission manager 1125, a PBCH formatter 1130, and a PBCH transmission manager 1135.

The synchronization signal transmission manager 1125 may be used to transmit at least one synchronization signal as part of an SS block. The at least one synchronization signal may have a first bandwidth. In some examples, the at least one synchronization signal may include at least one of a PSS, an SSS, or a combination thereof.

The PBCH formatter 1130 may be used to format a PBCH to be transmitted within a third bandwidth that is greater than the first bandwidth. The PBCH may include a self-decodable portion to be transmitted within a second bandwidth that is substantially within the first bandwidth. In some examples, the PBCH may be mapped to tones in at least the second bandwidth using a tone mapping that begins within the second bandwidth and alternates about a sync signal frequency within at least the second bandwidth. In some examples, the PBCH may be mapped to tones in the second bandwidth using a tone mapping that begins within the second bandwidth and is sequential within the second bandwidth.

The PBCH transmission manager 1135 may be used to transmit the PBCH as part of the SS block. In some examples, the PBCH may be transmitted in at least a first symbol and a second symbol, and may be rate matched to both the first symbol and the second symbol. In some examples, the PBCH may be transmitted in at least a first symbol and a second symbol, and may be rate matched to the first symbol and repeated in the second symbol. In some examples, the PBCH may be associated with a quasi-random phase shift in each of a plurality of resource elements.

Figure 12:
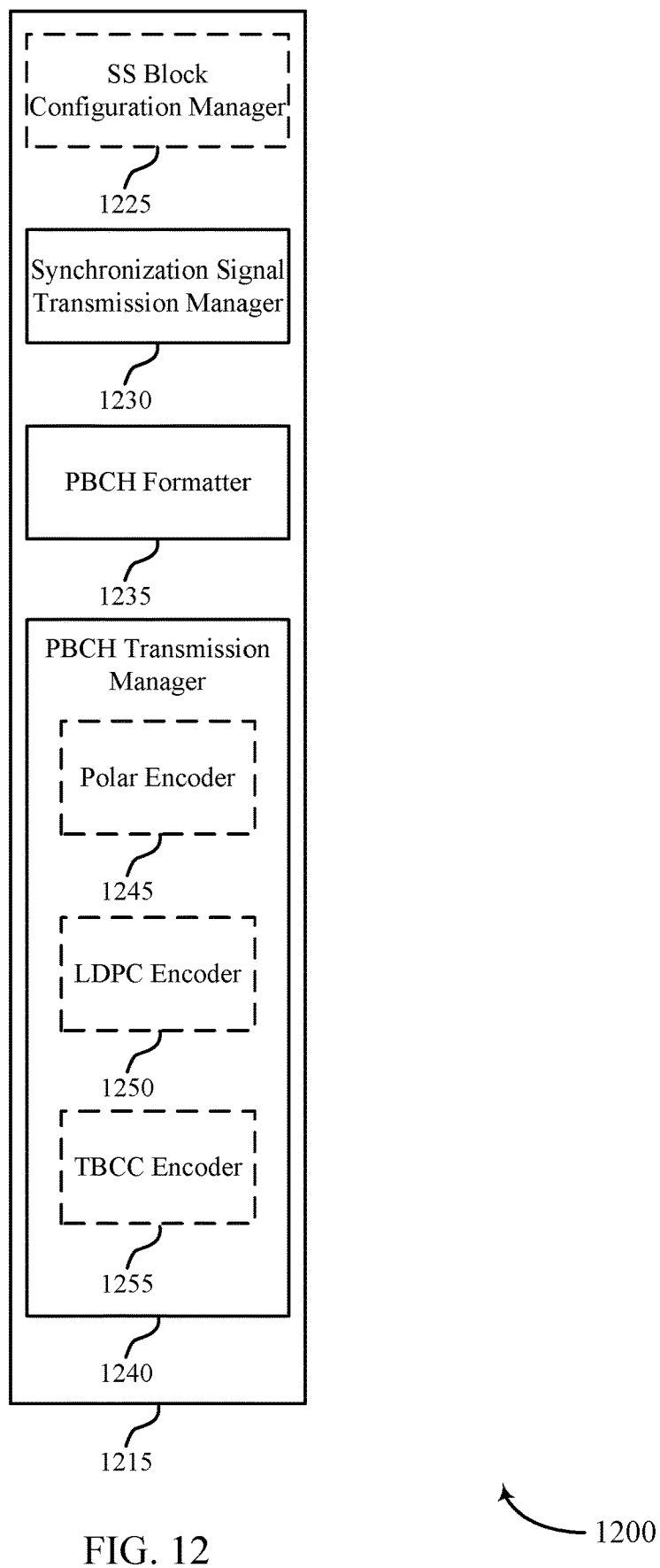
FIG. 12 shows a block diagram of a base station wireless communication manager, in accordance with various aspects of the present disclosure.

FIG. 12 shows a block diagram 1200 of a base station wireless communication manager 1215, in accordance with various aspects of the present disclosure. The base station wireless communication manager 1215 may be an example of aspects of the base station wireless communication manager 1115 described with reference to FIG. 11. The base station wireless communication manager 1215 may include an optional SS block configuration manager 1225, a synchronization signal transmission manager 1230, a PBCH formatter 1235, and a PBCH transmission manager 1240.

The PBCH formatter 1235 may include an optional polar encoder 1245, an optional LDPC encoder 1250, or an optional TBCC encoder 1255. Each of these components may communicate, directly or indirectly, with one another (e.g., via one or more buses). The synchronization signal transmission manager 1230, PBCH formatter 1235, and PBCH transmission manager 1240 may be examples of the synchronization signal transmission manager 1125, PBCH formatter 1130, and PBCH transmission manager 1135 described with reference to FIG. 11.

The SS block configuration manager 1225 may be used to transmit at least one of a first indication of a first bandwidth, a second indication of a sync signal frequency, or a combination thereof.

The synchronization signal transmission manager 1230 may be used to transmit at least one synchronization signal as part of an SS block. The at least one synchronization signal may have a first bandwidth. In some examples, the at least one synchronization signal may include at least one of a PSS, an SSS, or a combination thereof.

The PBCH formatter 1235 may be used to format a PBCH to be transmitted within a third bandwidth that is greater than the first bandwidth. The PBCH may include a self-decodable portion to be transmitted within a second bandwidth that is substantially within the first bandwidth. In some examples, the PBCH formatter 1235 may encode bits of the PBCH, and map encoded bits of the PBCH to the second bandwidth or the third bandwidth. In some examples, the PBCH formatter 1235 may map the PBCH to tones in at least the second bandwidth using a tone mapping that begins within the second bandwidth and alternates about a sync signal frequency within at least the second bandwidth. In some examples, the PBCH formatter 1235 may map the PBCH to tones in the second bandwidth using a tone mapping that begins within the second bandwidth and is sequential within the second bandwidth.

The PBCH transmission manager 1240 may be used to transmit the PBCH as part of the SS block. In some examples, the PBCH may be transmitted in at least a first symbol and a second symbol, and may be rate matched to both the first symbol and the second symbol. In some examples, the PBCH may be transmitted in at least a first symbol and a second symbol, and may be rate matched to the first symbol and repeated in the second symbol. In some examples, the PBCH may be associated with a quasi-random phase shift in each of a plurality of resource elements.

In some examples, the SS block configuration manager 1225 may also or alternatively transmit an indication that the SS block includes the self-decodable portion of the PBCH. In some examples, transmitting the indication may include signaling the indication in the at least one synchronization signal. In some examples, the at least one synchronization signal may include a PSS and an SSS transmitted from a same antenna port of the base station, and signaling the indication in the at least one synchronization signal may include encoding the indication in a difference between the PSS and the SSS.

In some examples, the polar encoder 1245 may be used to polar-encode bits of the PBCH and randomly interleave the polar-encoded bits of the PBCH within at least the second bandwidth. In some examples, interleaving the polar-encoded bits of the PBCH may include S-random interleaving the polar-encoded bits of the PBCH. In some examples, interleaving the polar-encoded bits of the PBCH may include use of any type of interleaver, including use of a triangular interleaver, a convolutional interleaver, or a rectangular interleaver and its variations (e.g., Parallel-rectangular interleaver, etc.).

In some examples, the polar encoder 1245 may be used to encode bits of the PBCH and map higher capacity polar-encoded bits of the PBCH to the second bandwidth.

In some examples, the LDPC encoder may be used to LDPC-encode bits of the PBCH and map at least LDPC-encoded bits of the PBCH that are associated with a self-decodable core of an LDPC graph to the second bandwidth.

In some examples, the polar encoder 1245, LDPC encoder 1250, or TBCC encoder 1255 may be used to encode bits of the PBCH using a polar encoding, an LDPC encoding, or a TBCC encoding, and may map encoded bits representing all PBCH information to the second bandwidth. In some of these examples, encoded bits representing repeated PBCH information may also be mapped to the second bandwidth and/or encoded bits representing repeated PBCH information may also be mapped to a portion of the third bandwidth outside the second bandwidth.

Figure 13:
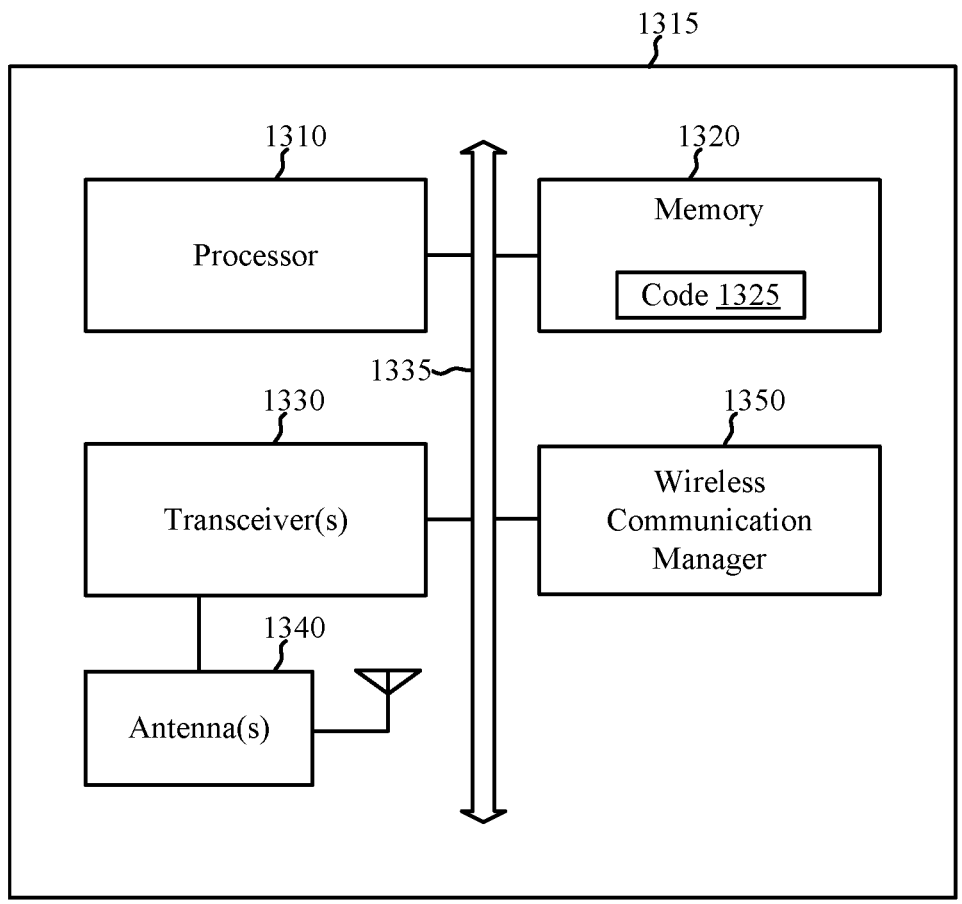
FIG. 13 shows a block diagram of a UE for use in wireless communication, in accordance with various aspects of the present disclosure.

FIG. 13 shows a block diagram 1300 of a UE 1315 for use in wireless communication, in accordance with various aspects of the present disclosure. The UE 1315 may be included or be part of a personal computer (e.g., a laptop computer, a netbook computer, a tablet computer, etc.), a cellular telephone, a PDA, a digital video recorder (DVR), an interne appliance, a gaming console, an e-reader, a vehicle, an appliance, a lighting or alarm control system, etc. The UE 1315 may, in some examples, have an internal power supply (not shown), such as a small battery, to facilitate mobile operation. In some examples, the UE 1315 may be an example of aspects of one or more of the UEs described with reference to FIGS. 1, 3, and 8, or aspects of the apparatus described with reference to FIG. 9. The UE 1315 may be configured to implement at least some of the UE or apparatus techniques or functions described with reference to FIGS. 1-10.

The UE 1315 may include a processor 1310, a memory 1320, at least one transceiver (represented by transceiver(s) 1330), at least one antenna (represented by antenna(s) 1340), or a UE wireless communication manager 1350. Each of these components may be in communication with each other, directly or indirectly, over one or more buses 1335.

The memory 1320 may include random access memory (RAM) or read-only memory (ROM). The memory 1320 may store computer-readable, computer-executable code 1325 containing instructions that are configured to, when executed, cause the processor 1310 to perform various functions described herein related to wireless communication, including, for example, receiving a synchronization signal having a first bandwidth within an SS block; receiving a self-decodable portion of a PBCH of the SS block (in which the self-decodable portion of the PBCH has a second bandwidth substantially within the first bandwidth, and the PBCH has a third bandwidth that is greater than the first bandwidth); and decoding the PBCH based on the self-decodable portion of the PBCH. Alternatively, the computer-executable code 1325 may not be directly executable by the processor 1310 but be configured to cause the UE 1315 (e.g., when compiled and executed) to perform various of the functions described herein.

The processor 1310 may include an intelligent hardware device, e.g., a central processing unit (CPU), a microcontroller, an ASIC, etc. The processor 1310 may process information received through the transceiver(s) 1330 or information to be sent to the transceiver(s) 1330 for transmission through the antenna(s) 1340. The processor 1310 may handle, alone or in connection with the UE wireless communication manager 1350, one or more aspects of communicating over (or managing communications over) one or more radio frequency spectrum bands.

The transceiver(s) 1330 may include a modem configured to modulate packets and provide the modulated packets to the antenna(s) 1340 for transmission, and to demodulate packets received from the antenna(s) 1340. The transceiver(s) 1330 may, in some examples, be implemented as one or more transmitters and one or more separate receivers. The transceiver(s) 1330 may support communications in one or more radio frequency spectrum bands. The transceiver(s) 1330 may be configured to communicate bi-directionally, via the antenna(s) 1340, with one or more base stations or apparatuses, such as one or more of the base stations or apparatuses described with reference to FIGS. 1, 3, 8, and 11.

The UE wireless communication manager 1350 may be configured to perform or control some or all of the UE or apparatus techniques or functions described with reference to FIGS. 1-10. The UE wireless communication manager 1350, or portions of it, may include a processor, or some or all of the functions of the UE wireless communication manager 1350 may be performed by the processor 1310 or in connection with the processor 1310. In some examples, the UE wireless communication manager 1350 may be an example of aspects of one or more of the UE wireless communication managers described with reference to FIGS. 8 and 9.

Figure 14:
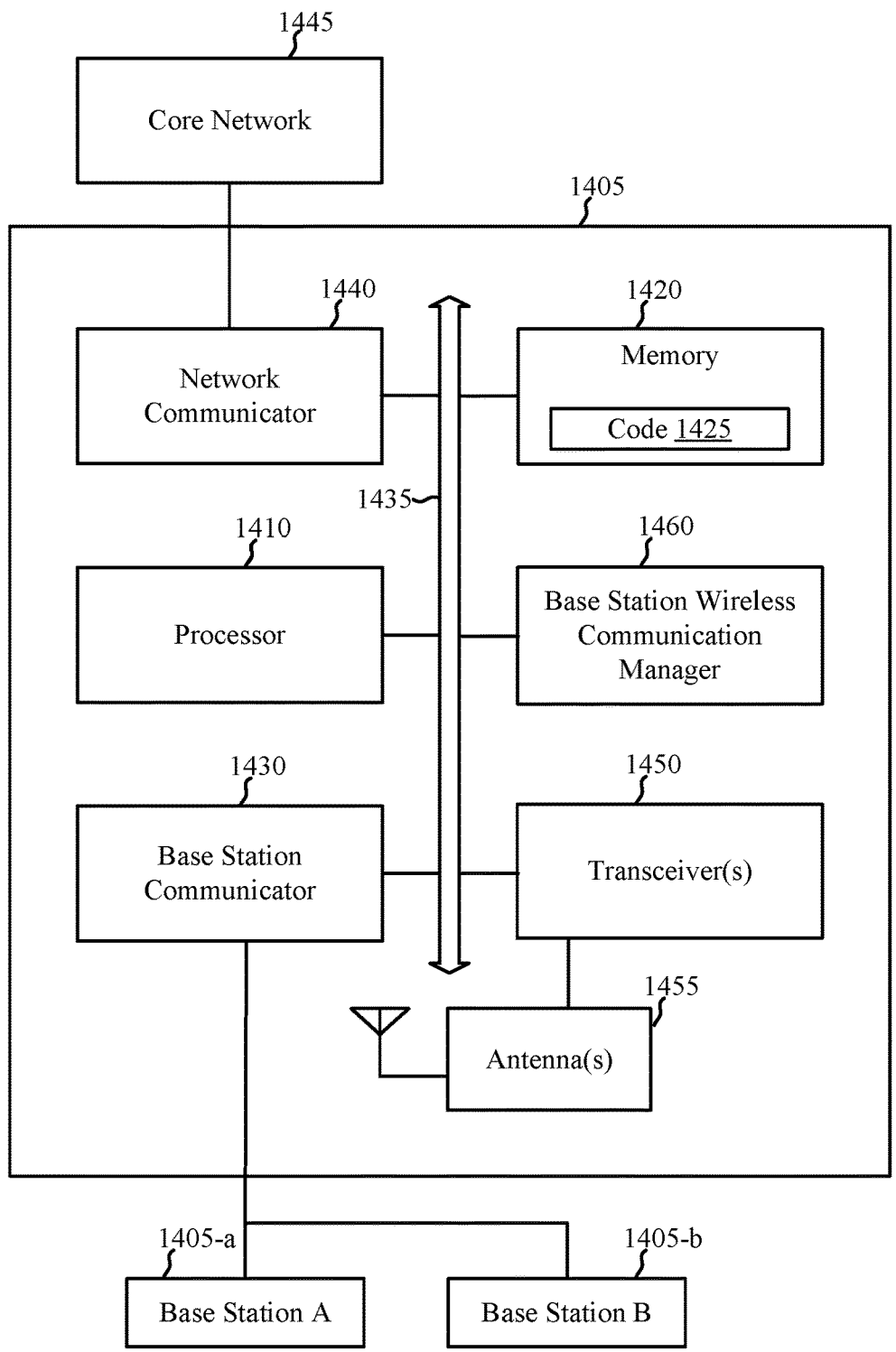
FIG. 14 shows a block diagram of a base station for use in wireless communication, in accordance with various aspects of the present disclosure.

FIG. 14 shows a block diagram 1400 of a base station 1405 for use in wireless communication, in accordance with various aspects of the present disclosure. In some examples, the base station 1405 may be an example of aspects of one or more of the base stations described with reference to FIGS. 1, 3, and 8, or aspects of the apparatus described with reference to FIG. 11. The base station 1405 may be configured to implement or facilitate at least some of the base station or apparatus techniques or functions described with reference to FIGS. 1-8, 11, and 12.

The base station 1405 may include a processor 1410, a memory 1420, at least one transceiver (represented by transceiver(s) 1450), at least one antenna (represented by antenna(s) 1455), or a base station wireless communication manager 1460. The base station 1405 may also include one or more of a base station communicator 1430 or a network communicator 1440. Each of these components may be in communication with each other, directly or indirectly, over one or more buses 1435.

The memory 1420 may include RAM or ROM. The memory 1420 may store computer-readable, computer-executable code 1425 containing instructions that are configured to, when executed, cause the processor 1410 to perform various functions described herein related to wireless communication, including, for example, transmitting at least one synchronization signal, having a first bandwidth, as part of an SS block; formatting a PBCH to be transmitted within a third bandwidth that is greater than the first bandwidth; and transmitting the PBCH as part of the SS block. The PBCH may include a self-decodable portion to be transmitted within a second bandwidth that is substantially within the first bandwidth. Alternatively, the computer-executable code 1425 may not be directly executable by the processor 1410 but be configured to cause the base station 1405 (e.g., when compiled and executed) to perform various of the functions described herein.

The processor 1410 may include an intelligent hardware device, e.g., a CPU, a microcontroller, an ASIC, etc. The processor 1410 may process information received through the transceiver(s) 1450, the base station communicator 1430, or the network communicator 1440. The processor 1410 may also process information to be sent to the transceiver(s) 1450 for transmission through the antenna(s) 1455, or to the base station communicator 1430 for transmission to one or more other base stations (e.g., base station 1405a and base station 1405-b), or to the network communicator 1440 for transmission to a core network 1445, which may be an example of one or more aspects of the core network 130 described with reference to FIG. 1. The processor 1410 may handle, alone or in connection with the base station wireless communication manager 1460, one or more aspects of communicating over (or managing communications over) one or more radio frequency spectrum bands.

The transceiver(s) 1450 may include a modem configured to modulate packets and provide the modulated packets to the antenna(s) 1455 for transmission, and to demodulate packets received from the antenna(s) 1455. The transceiver(s) 1450 may, in some examples, be implemented as one or more transmitters and one or more separate receivers. The transceiver(s) 1450 may support communications in one or more radio frequency spectrum bands. The transceiver(s) 1450 may be configured to communicate bi-directionally, via the antenna(s) 1455, with one or more UEs or apparatuses, such as one or more of the UEs or apparatuses described with reference to FIGS. 1, 3, 8, and 9. The base station 1405 may communicate with the core network 1445 through the network communicator 1440. The base station 1405 may also communicate with other base stations, such as the base station 1405-a and the base station 1405-b, using the base station communicator 1430.

The base station wireless communication manager 1460 may be configured to perform or control some or all of the base station or apparatus techniques or functions described with reference to FIGS. 1-8, 11, and 12. The base station wireless communication manager 1460, or portions of it, may include a processor, or some or all of the functions of the base station wireless communication manager 1460 may be performed by the processor 1410 or in connection with the processor 1410. In some examples, the base station wireless communication manager 1460 may be an example of aspects of one or more of the base station wireless communication managers described with reference to FIGS. 11 and 12.

Figure 15:
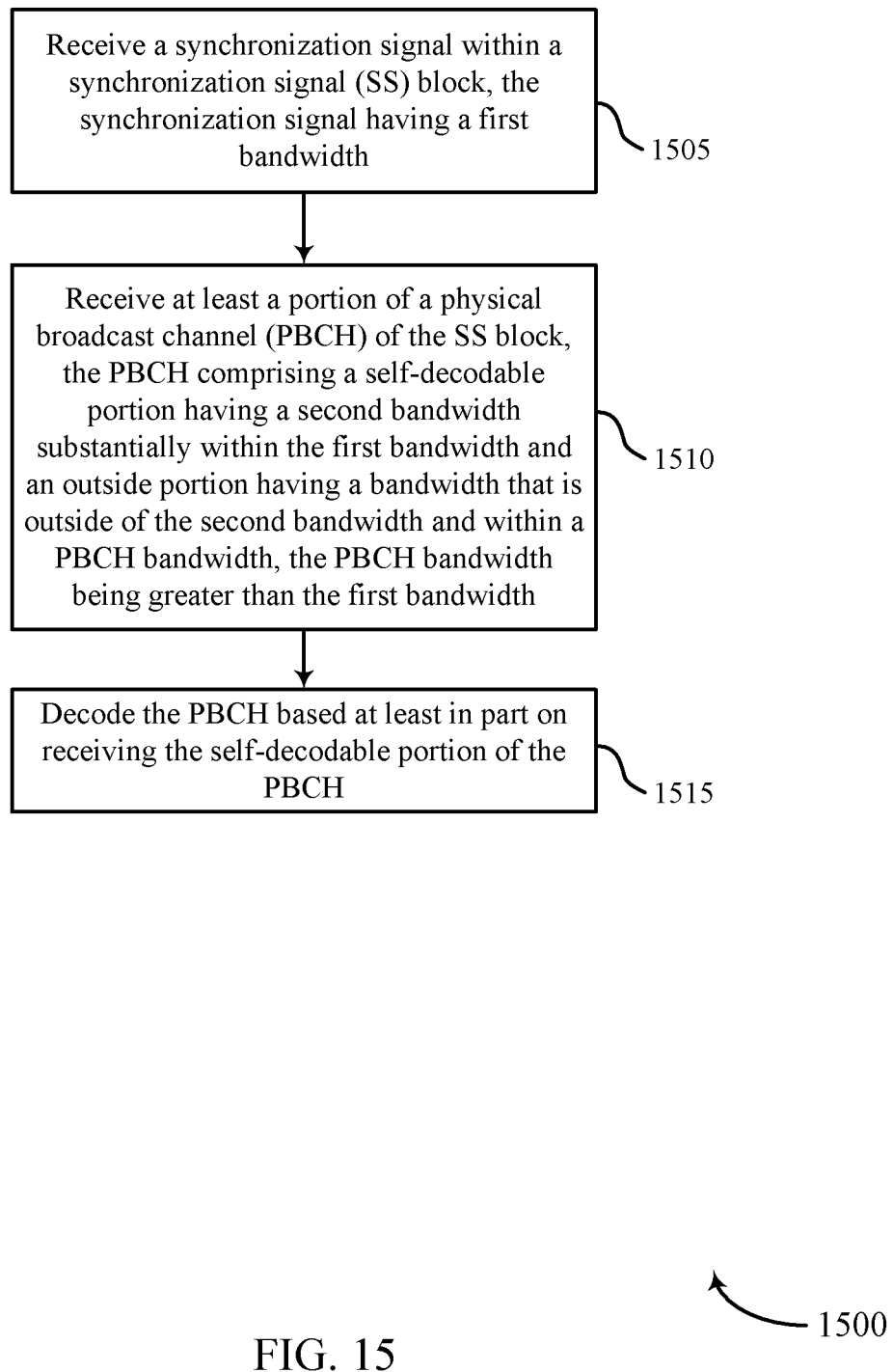
FIG. 15 is a flow chart illustrating an example of a method for wireless communication at a UE, in accordance with various aspects of the present disclosure.

FIG. 15 is a flow chart illustrating an example of a method 1500 for wireless communication at a UE, in accordance with various aspects of the present disclosure. For clarity, the method 1500 is described below with reference to aspects of one or more of the UEs described with reference to FIGS. 1, 3, 8, and 13, aspects of the apparatus described with reference to FIG. 9, or aspects of one or more of the UE wireless communication managers described with reference to FIGS. 9, 10, and 13. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving a synchronization signal within an SS block. The synchronization signal may have a first bandwidth. In some examples, the at least one synchronization signal may include at least one of a PSS, an SSS, or a combination thereof. In some examples, the operation(s) at block 1505 may be performed using the synchronization signal decoding manager described with reference to FIGS. 9 and 10.

At block 1510, the method 1500 may include receiving at least a portion of a PBCH of the SS block, the PBCH comprising a self-decodable portion and an outside portion. The self-decodable portion of the PBCH may have a second bandwidth substantially within the first bandwidth. The outside portion may have a bandwidth that is outside of the second bandwidth and within a PBCH bandwidth, the PBCH bandwidth being greater than the first bandwidth.

In some examples, the self-decodable portion of the PBCH may be received in at least a first symbol and a second symbol, and may be rate matched to both the first symbol and the second symbol. In some examples, the PBCH may occupy at least a first symbol and a second symbol, and may be rate matched to the first symbol and repeated in the second symbol. In some examples, the PBCH may be associated with a quasi-random phase shift in each of a plurality of resource elements. In some examples, the operation(s) at block 1510 may be performed using the PBCH decoding manager described with reference to FIGS. 9 and 10.

At block 1515, the method 1500 may include decoding the PBCH based at least in part on receiving the self-decodable portion of the PBCH. In some examples, the PBCH may be decoded based on a tone mapping that begins within the second bandwidth and alternates about a sync signal frequency within at least the second bandwidth. In some examples, the PBCH may be decoded based on a tone mapping that begins within the second bandwidth and is sequential within the second bandwidth. In some examples, the operation(s) at block 1515 may be performed using the PBCH decoding manager described with reference to FIGS. 9 and 10.

Figure 16:
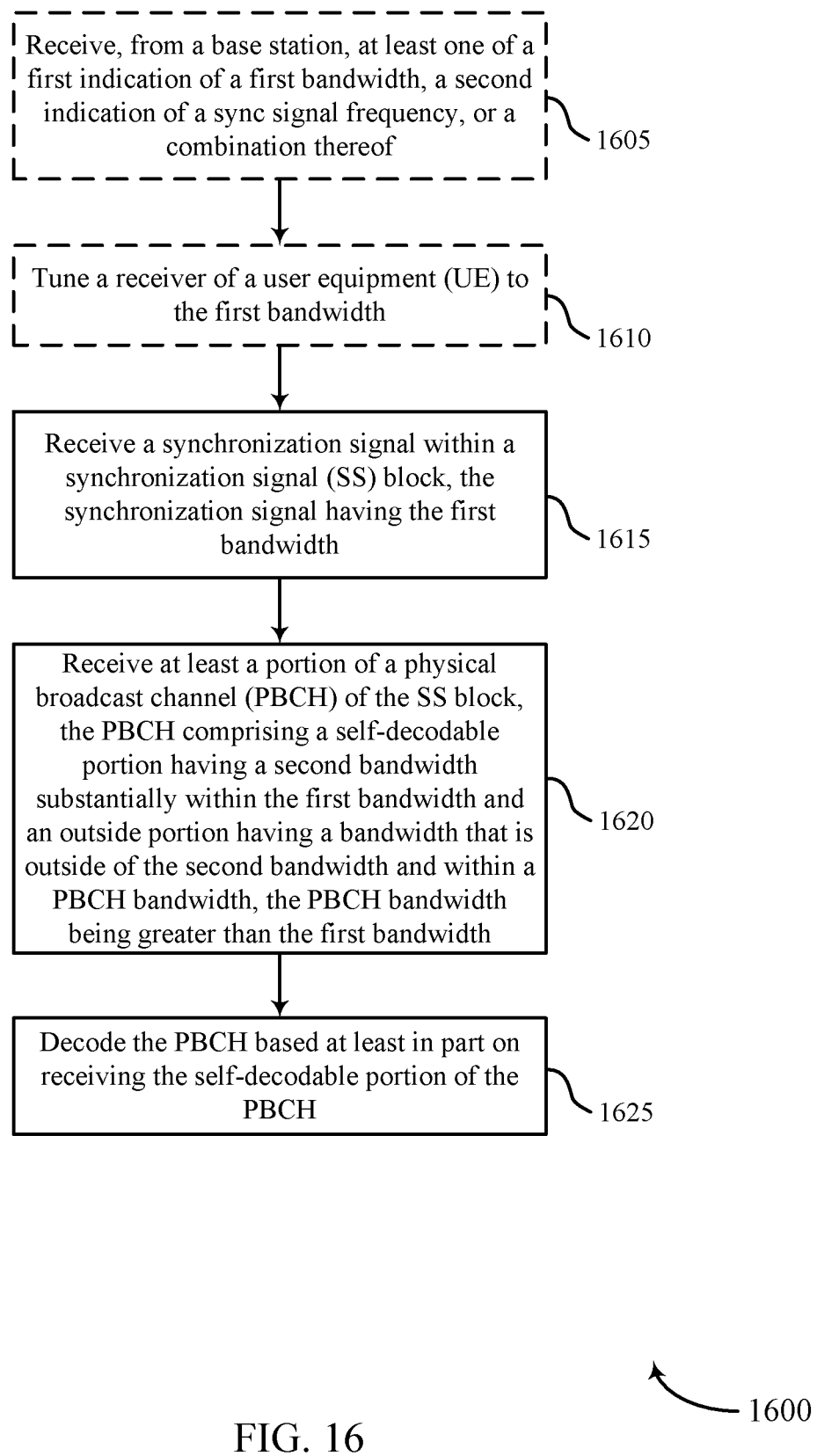
FIG. 16 is a flow chart illustrating an example of a method for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs described with reference to FIGS. 1, 3, 8, and 13, aspects of the apparatus described with reference to FIG. 9, or aspects of one or more of the UE wireless communication managers described with reference to FIGS. 9, 10, and 13. In some examples, a UE may execute one or more sets of codes to control the functional elements of the UE to perform the functions described below. Additionally or alternatively, the UE may perform one or more of the functions described below using special-purpose hardware.

At block 1605, the method 1600 may optionally include receiving, from a base station, at least one of a first indication of a first bandwidth, a second indication of a sync signal frequency, or a combination thereof. In some examples, the operation(s) at block 1605 may be performed using the SS block configuration manager described with reference to FIG. 10.

At block 1610, the method 1600 may optionally include tuning a receiver of the UE to the first bandwidth. In some examples, the operation(s) at block 1610 may be performed using the tuner described with reference to FIG. 10.

At block 1615, the method 1600 may include receiving a synchronization signal within an SS block. The synchronization signal may have the first bandwidth. In some examples, the at least one synchronization signal may include at least one of a PSS, an SSS, or a combination thereof. In some examples, the operation(s) at block 1615 may be performed using the synchronization signal decoding manager described with reference to FIGS. 9 and 10.

At block 1620, the method 1600 may include receiving at least a portion of a PBCH of the SS block, the PBCH comprising a self-decodable portion and an outside portion.

The self-decodable portion of the PBCH may have a second bandwidth substantially within the first bandwidth. The outside portion may have a bandwidth that is outside of the second bandwidth and within a PBCH bandwidth, the PBCH bandwidth being greater than the first bandwidth.

In some examples, the PBCH may occupy at least a first symbol and a second symbol, and may be rate matched to the first symbol and repeated in the second symbol. In some examples, the PBCH may be associated with a quasi-random phase shift in each of a plurality of resource elements. In some examples, the operation(s) at block 1620 may be performed using the PBCH decoding manager described with reference to FIGS. 9 and 10.

At block 1625, the method 1600 may include decoding the PBCH based at least in part on receiving the self-decodable portion of the PBCH. In some examples, the PBCH may be decoded based on a tone mapping that begins within the second bandwidth and alternates about a sync signal frequency within at least the second bandwidth. In some examples, the PBCH may be decoded based on a tone mapping that begins within the second bandwidth and is sequential within the second bandwidth. In some examples, the operation(s) at block 1625 may be performed using the PBCH decoding manager described with reference to FIGS. 9 and 10.

In some examples, the method 1600 may include receiving, from a base station, an indication that the SS block includes the self-decodable portion of the PBCH. In some examples, the indication may be signaled in the at least one synchronization signal. In some examples, the at least one synchronization signal may include a PSS and an SSS transmitted from a same antenna port of the base station, and receiving the indication that the SS block includes the self-decodable portion of the PBCH may include detecting a difference between the PSS and the SSS.

In some examples of the method 1600, received bits of the PBCH may be polar-encoded and randomly interleaved, and decoding the PBCH (at block 1625) may include performing a polar decode of the PBCH based on a set of polar-encoded bits of the PBCH included in the self-decodable portion of the PBCH. In some examples, the received bits of the PBCH may be S-random interleaved. In some examples, interleaving the polar-encoded bits of the PBCH may include use of any type of interleaver, including use of a triangular interleaver, a convolutional interleaver, or a rectangular interleaver and its variations (e.g., Parallel-rectangular interleaver, etc.).

In some examples of the method 1600, received bits of the PBCH may be polar-encoded, and decoding the PBCH (at block 1625) may include characterizing bits of the PBCH associated with tones outside the first bandwidth as punctured bits of a polar code.

In some examples of the method 1600, received bits of the PBCH may be LDPC-encoded, and decoding the PBCH (at block 1625) may include mapping a set of bits of the PBCH, included in the self-decodable portion of the PBCH, to at least a self-decodable core of an LDPC graph.

In some examples of the method 1600, received bits of the PBCH may be polar-encoded, LDPC-encoded, or TBCC-encoded, and encoded bits of the PBCH included in the self-decodable portion of the PBCH may include all PBCH information. In some of these examples, encoded bits of the PBCH included in the self-decodable portion of the PBCH may include repeated PBCH information and/or encoded bits of the PBCH outside the self-decodable portion of the PBCH may include repeated PBCH information.

Figure 17:
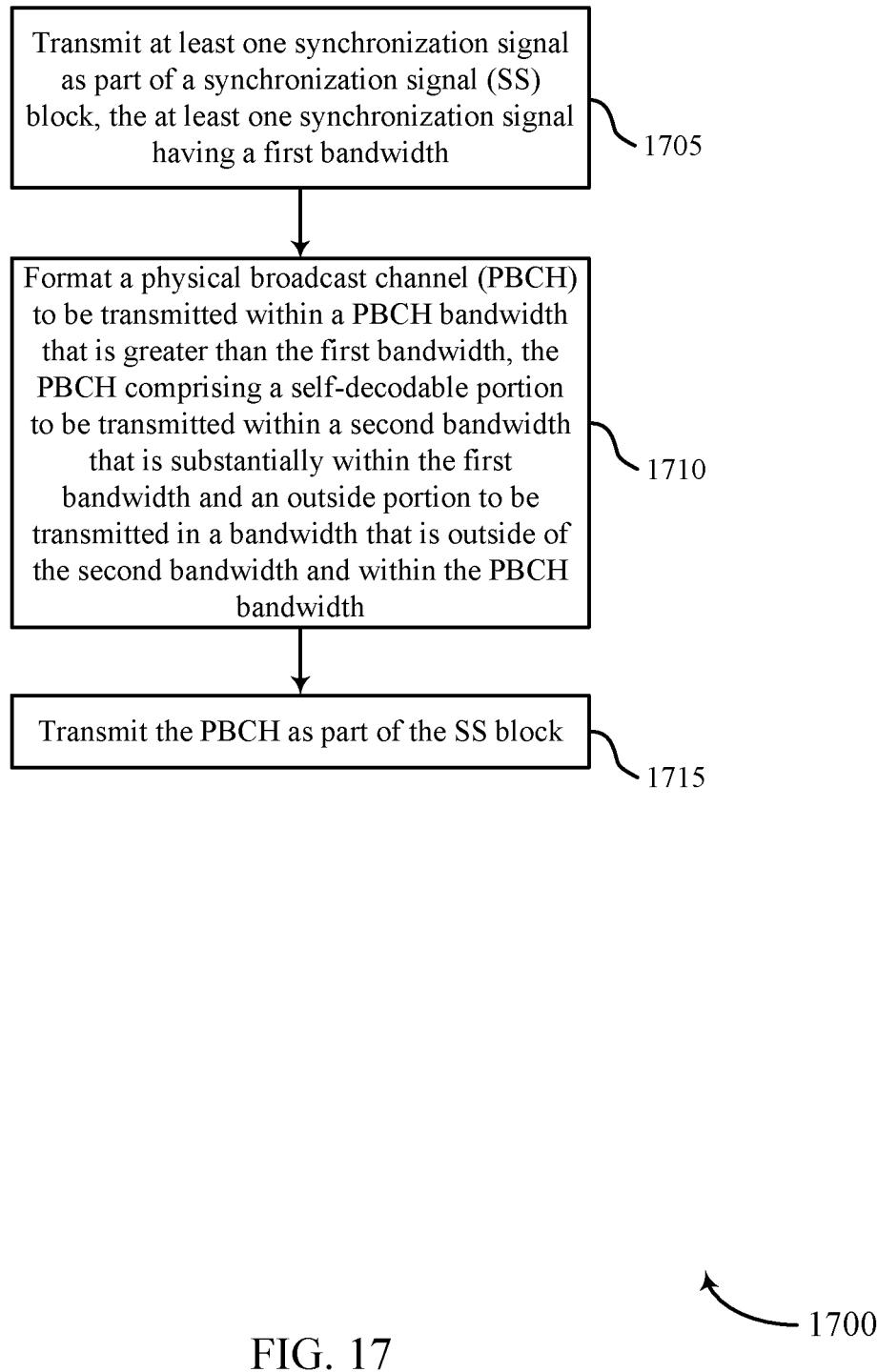
FIG. 17 is a flow chart illustrating an example of a method for wireless communication at a base station, in accordance with various aspects of the present disclosure.

FIG. 17 is a flow chart illustrating an example of a method 1700 for wireless communication at a base station, in accordance with various aspects of the present disclosure. For clarity, the method 1700 is described below with reference to aspects of one or more of the base stations described with reference to FIGS. 1, 3, 8, and 14, aspects of the apparatus described with reference to FIG. 11, or aspects of one or more of the UE wireless communication managers described with reference to FIGS. 11, 12, and 14. In some examples, a base station may execute one or more sets of codes to control the functional elements of the base station to perform the functions described below. Additionally or alternatively, the base station may perform one or more of the functions described below using special-purpose hardware.

At block 1705, the method 1700 may include transmitting at least one synchronization signal as part of an SS block. The at least one synchronization signal may have a first bandwidth. In some examples, the at least one synchronization signal may include at least one of a PSS, an SSS, or a combination thereof. In some examples, the operation(s) at block 1705 may be performed using the synchronization signal transmission manager described with reference to FIGS. 11 and 12.

At block 1710, the method 1700 may include formatting a PBCH to be transmitted within a PBCH bandwidth that is greater than the first bandwidth. The PBCH may include a self-decodable portion to be transmitted within a second bandwidth that is substantially within the first bandwidth. The PBCH may also include an outside portion to be transmitted in a bandwidth that is outside of the second bandwidth and within the PBCH bandwidth.

In some examples, the PBCH may be mapped to tones in at least the second bandwidth using a tone mapping that begins within the second bandwidth and alternates about a sync signal frequency within at least the second bandwidth. In some examples, the PBCH may be mapped to tones in the second bandwidth using a tone mapping that begins within the second bandwidth and is sequential within the second bandwidth. In some examples, the operation(s) at block 1710 may be performed using the PBCH formatter described with reference to FIGS. 11 and 12.

At block 1715, the method 1700 may include transmitting the PBCH as part of the SS block. In some examples, the PBCH may be transmitted in at least a first symbol and a second symbol, and may be rate matched to both the first symbol and the second symbol. In some examples, the PBCH may be transmitted in at least a first symbol and a second symbol, and may be rate matched to the first symbol and repeated in the second symbol. In some examples, the PBCH may be associated with a quasi-random phase shift in each of a plurality of resource elements. In some examples, the operation(s) at block 1715 may be performed using the PBCH transmission manager described with reference to FIGS. 11 and 12.

Figure 18:
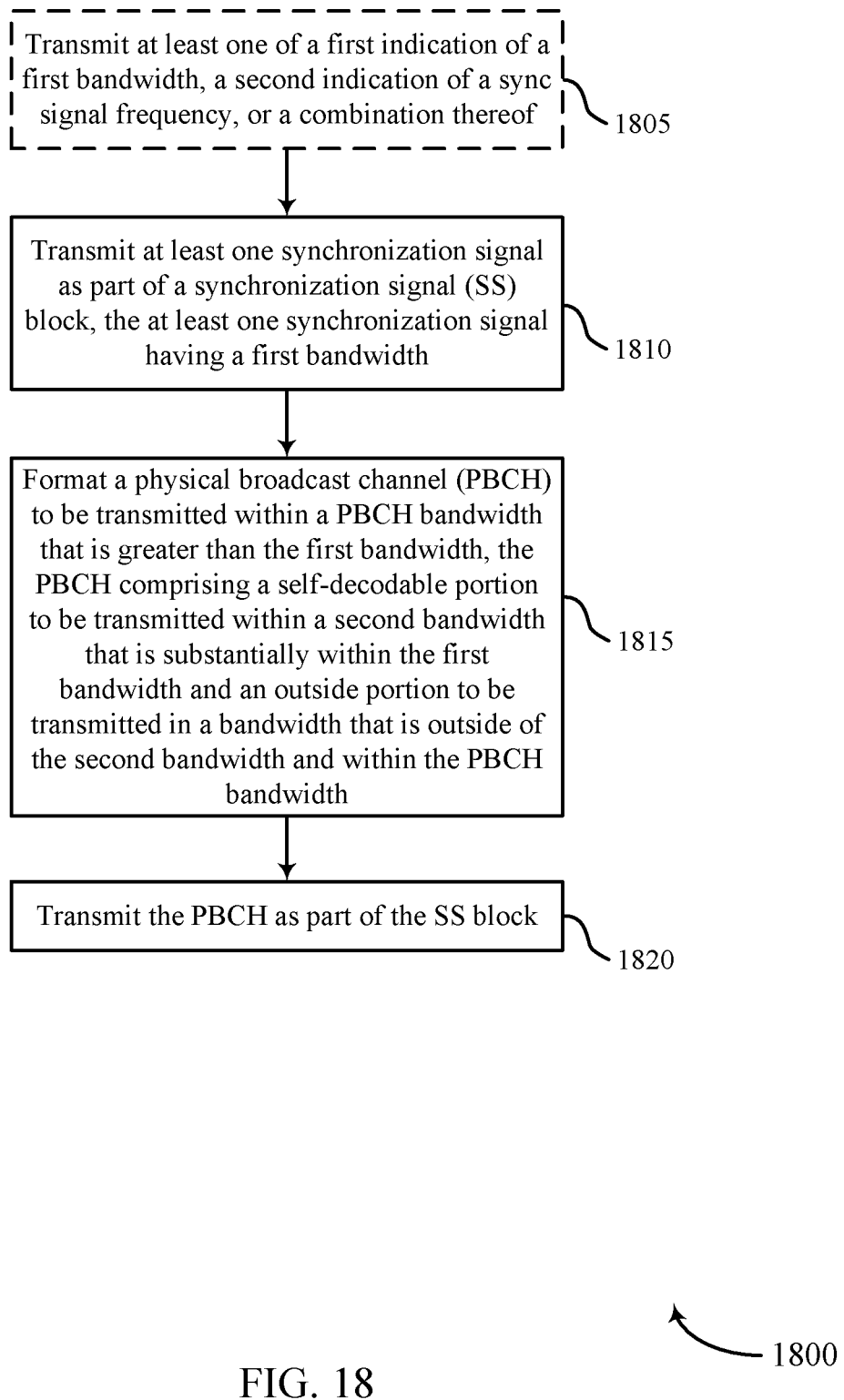
FIG. 18 is a flow chart illustrating an example of a method for wireless communication at a base station, in accordance with various aspects of the present disclosure.

FIG. 18 is a flow chart illustrating an example of a method 1800 for wireless communication at a base station, in accordance with various aspects of the present disclosure. For clarity, the method 1800 is described below with reference to aspects of one or more of the base stations described with reference to FIGS. 1, 3, 8, and 14, aspects of the apparatus described with reference to FIG. 11, or aspects of one or more of the UE wireless communication managers described with reference to FIGS. 11, 12, and 14. In some examples, a base station may execute one or more sets of codes to control the functional elements of the base station to perform the functions described below. Additionally or alternatively, the base station may perform one or more of the functions described below using special-purpose hardware.

At block 1805, the method 1800 may optionally include transmitting at least one of a first indication of a first bandwidth, a second indication of a sync signal frequency, or a combination thereof. In some examples, the operation(s) at block 1805 may be performed using the SS block configuration manager described with reference to FIG. 12.

At block 1810, the method 1800 may include transmitting at least one synchronization signal as part of an SS block. The at least one synchronization signal may have a first bandwidth. In some examples, the at least one synchronization signal may include at least one of a PSS, an SSS, or a combination thereof. In some examples, the operation(s) at block 1810 may be performed using the synchronization signal transmission manager described with reference to FIGS. 11 and 12.

At block 1815, the method 1800 may include formatting a PBCH to be transmitted within a PBCH bandwidth that is greater than the first bandwidth. The PBCH may include a self-decodable portion to be transmitted within a second bandwidth that is substantially within the first bandwidth. The PBCH may also include an outside portion to be transmitted in a bandwidth that is outside of the second bandwidth and within the PBCH bandwidth.

In some examples, the operation(s) at block 1815 may include encoding bits of the PBCH, and mapping encoded bits of the PBCH to the second bandwidth or the third bandwidth. In some examples, the PBCH may be mapped to tones in at least the second bandwidth using a tone mapping that begins within the second bandwidth and alternates about a sync signal frequency within at least the second bandwidth. In some examples, the PBCH may be mapped to tones in the second bandwidth using a tone mapping that begins within the second bandwidth and is sequential within the second bandwidth. In some examples, the operation(s) at block 1815 may be performed using the PBCH formatter described with reference to FIGS. 11 and 12.

At block 1820, the method 1800 may include transmitting the PBCH as part of the SS block. In some examples, the PBCH may be transmitted in at least a first symbol and a second symbol, and may be rate matched to both the first symbol and the second symbol. In some examples, the PBCH may be transmitted in at least a first symbol and a second symbol, and may be rate matched to the first symbol and repeated in the second symbol. In some examples, the PBCH may be associated with a quasi-random phase shift in each of a plurality of resource elements. In some examples, the operation(s) at block 1820 may be performed using the PBCH transmission manager described with reference to FIGS. 11 and 12.

In some examples, the method 1800 may include transmitting an indication that the SS block includes the self-decodable portion of the PBCH. In some examples, transmitting the indication may include signaling the indication in the at least one synchronization signal. In some examples, the at least one synchronization signal may include a PSS and an SSS transmitted from a same antenna port of the base station, and signaling the indication in the at least one synchronization signal may include encoding the indication in a difference between the PSS and the SSS.

In some examples of the method 1800, the operation(s) at block 1815 may include polar-encoding bits of the PBCH, and randomly interleaving the polar-encoded bits of the PBCH within at least the second bandwidth. In some examples, interleaving the polar-encoded bits of the PBCH may include S-random interleaving the polar-encoded bits of the PBCH.

In some examples of the method 1800, the operation(s) at block 1815 may include polar-encoding bits of the PBCH, and mapping higher capacity polar-encoded bits of the PBCH to the second bandwidth.

In some examples of the method 1800, the operation(s) at block 1815 may include LDPC-encoding bits of the PBCH, and mapping at least LDPC-encoded bits of the PBCH that are associated with a self-decodable core of an LDPC graph to the second bandwidth.

In some examples of the method 1800, the operation(s) at block 1815 may include encoding bits of the PBCH using a polar encoding, a LDPC encoding, or a TBCC encoding, and mapping encoded bits representing all PBCH information to the second bandwidth. In some of these examples, the method 1800 may further include mapping encoded bits representing repeated PBCH information to the second bandwidth and/or mapping encoded bits representing repeated PBCH information to a portion of the third bandwidth outside the second bandwidth.

The methods 1500, 1600, 1700, and 1800 are example implementations of some of the techniques described in the present disclosure, and the operations of the methods may be rearranged, combined with other operations of the same or a different method, or otherwise modified or supplemented, such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communication at a user equipment (UE), comprising:
   receiving a synchronization signal within a synchronization signal (SS) block, the synchronization signal having a first bandwidth;
   receiving a physical broadcast channel (PBCH) of the SS block, the PBCH comprising a first portion having a second bandwidth within the first bandwidth and a second portion having a bandwidth that is outside of the second bandwidth and within a PBCH bandwidth, the PBCH bandwidth being greater than the first bandwidth; and
   decoding the PBCH based on the first portion of the PBCH and exclusive of the second portion of the PBCH.

2. The method of claim 1, wherein received bits of the PBCH are polar-encoded and randomly interleaved, and decoding the PBCH comprises:
   performing a polar decode of the PBCH based on a set of bits of the PBCH included in the first portion of the PBCH.

3. The method of claim 2, wherein the received bits of the PBCH are S-random interleaved.

4. The method of claim 2, wherein the received bits of the PBCH are interleaved using a triangular interleaver, a convolutional interleaver, a rectangular interleaver, or a Parallel-rectangular interleaver.

5. The method of claim 1, wherein received bits of the PBCH are polar-encoded, and decoding the PBCH comprises:
   characterizing bits of the PBCH associated with tones outside the first bandwidth as punctured bits of a polar code.

6. The method of claim 1, wherein received bits of the PBCH are low-density parity-check (LDPC)-encoded, and decoding the PBCH comprises:
   mapping a set of bits of the PBCH, included in the first portion of the PBCH, to at least a self-decodable core of an LDPC graph.

7. The method of claim 1, wherein received bits of the PBCH are polar-encoded, low-density parity-check (LDPC)-encoded, or tail-biting convolutional code (TBCC)-encoded, and encoded bits of the PBCH included in the first portion of the PBCH include all PBCH information.

8. The method of claim 7, wherein the encoded bits of the PBCH included in the first portion of the PBCH include repeated PBCH information.

9. The method of claim 7, wherein the encoded bits of the PBCH outside the first portion of the PBCH include repeated PBCH information.

10. The method of claim 1, further comprising:
receiving, from a base station, an indication that the SS block includes the first portion of the PBCH.

11. The method of claim 10, wherein the indication is signaled in the synchronization signal.

12. The method of claim 11, wherein the synchronization signal comprises a primary synchronization signal (PSS) transmitted from an antenna port of the base station and a secondary synchronization signal (SSS) transmitted from the antenna port of the base station, and receiving the indication that the SS block includes the first portion of the PBCH comprises:
detecting a difference between the PSS and the SSS.

13. The method of claim 1, further comprising:
receiving, from a base station, at least one of: a first indication of the first bandwidth, a second indication of a sync signal frequency, or a combination thereof.

14. The method of claim 1, further comprising:
tuning a receiver of the UE to the first bandwidth.

15. The method of claim 1, wherein the PBCH is decoded based on a tone mapping that begins within the second bandwidth and alternates about a sync signal frequency within at least the second bandwidth.

16. The method of claim 1, wherein the PBCH is decoded based on a tone mapping that begins within the second bandwidth and is sequential within the second bandwidth.

17. The method of claim 1, wherein the first portion of the PBCH is received in at least a first symbol and a second symbol and is rate matched to both the first symbol and the second symbol.

18. The method of claim 1, wherein the PBCH occupies at least a first symbol and a second symbol and is rate matched to the first symbol and repeated in the second symbol.

19. The method of claim 18, wherein the PBCH is associated with a quasi-random phase shift in each of a plurality of resource elements.

20. The method of claim 1, wherein the synchronization signal comprises at least one of: a primary synchronization signal (PSS), a secondary synchronization signal (SSS), or a combination thereof.

21. An apparatus for wireless communication at a user equipment (UE), comprising:
means for receiving a synchronization signal within a synchronization signal (SS) block, the synchronization signal having a first bandwidth;
means for receiving a physical broadcast channel (PBCH) of the SS block, the PBCH comprising a first portion having a second bandwidth within the first bandwidth and a second portion having a bandwidth that is outside of the second bandwidth and within a PBCH bandwidth, the PBCH bandwidth being greater than the first bandwidth; and
means for decoding the PBCH based on the first portion of the PBCH and exclusive of the second portion of the PBCH.

22. An apparatus for wireless communication at a user equipment (UE), comprising:
a processor;
memory in electronic communication with the processor; and
instructions stored in the memory, the instructions being executable by the processor to:
receive a synchronization signal within a synchronization signal (SS) block, the synchronization signal having a first bandwidth;
receive a physical broadcast channel (PBCH) of the SS block, the PBCH comprising a first portion having a second bandwidth within the first bandwidth and a second portion having a bandwidth that is outside of the second bandwidth and within a PBCH bandwidth, the PBCH bandwidth being greater than the first bandwidth; and
decode the PBCH based on the first portion of the PBCH and exclusive of the second portion of the PBCH.

23. The apparatus of claim 22, wherein received bits of the PBCH are polar-encoded and randomly interleaved, and decoding the PBCH comprises:
performing a polar decode of the PBCH based on a set of bits of the PBCH included in the first portion of the PBCH.

24. The apparatus of claim 23, wherein the received bits of the PBCH are S-random interleaved.

25. The apparatus of claim 23, wherein the received bits of the PBCH are interleaved using a triangular interleaver, a convolutional interleaver, a rectangular interleaver, or a Parallel-rectangular interleaver.

26. The apparatus of claim 22, wherein received bits of the PBCH are polar-encoded, and decoding the PBCH comprises:
characterizing bits of the PBCH associated with tones outside the first bandwidth as punctured bits of a polar code.

27. The apparatus of claim 22, wherein received bits of the PBCH are low-density parity-check (LDPC)-encoded, and decoding the PBCH comprises:
mapping a set of bits of the PBCH, included in the first portion of the PBCH, to at least a self-decodable core of an LDPC graph.

28. The apparatus of claim 22, wherein received bits of the PBCH are polar-encoded, low-density parity-check (LDPC)-encoded, or tail-biting convolutional code (TBCC)-encoded, and encoded bits of the PBCH included in the first portion of the PBCH include all PBCH information.

29. The apparatus of claim 28, wherein the encoded bits of the PBCH included in the first portion of the PBCH include repeated PBCH information.

30. The apparatus of claim 28, wherein the encoded bits of the PBCH outside the first portion of the PBCH include repeated PBCH information.

31. The apparatus of claim 22, wherein the instructions are executable by the processor to:
receive, from a base station, an indication that the SS block includes the first portion of the PBCH.

32. The apparatus of claim 31, wherein the indication is signaled in the synchronization signal.

33. The apparatus of claim 32, wherein the synchronization signal comprises a primary synchronization signal (PSS) transmitted from an antenna port of the base station and a secondary synchronization signal (SSS) transmitted from the antenna port of the base station, and receiving the indication that the SS block includes the first portion of the PBCH comprises:
  detecting a difference between the PSS and the SSS.

34. The apparatus of claim 22, wherein the instructions are executable by the processor to:
  receive, from a base station, at least one of: a first indication of the first bandwidth, a second indication of a sync signal frequency, or a combination thereof.

35. The apparatus of claim 22, wherein the instructions are executable by the processor to:
  tune a receiver of the UE to the first bandwidth.

36. The apparatus of claim 22, wherein the PBCH is decoded based on a tone mapping that begins within the second bandwidth and alternates about a sync signal frequency within at least the second bandwidth.

37. The apparatus of claim 22, wherein the PBCH is decoded based on a tone mapping that begins within the second bandwidth and is sequential within the second bandwidth.

38. The apparatus of claim 22, wherein the first portion of the PBCH is received in at least a first symbol and a second symbol and is rate matched to both the first symbol and the second symbol.

39. The apparatus of claim 22, wherein the PBCH occupies at least a first symbol and a second symbol and is rate matched to the first symbol and repeated in the second symbol.

40. The apparatus of claim 39, wherein the PBCH is associated with a quasi-random phase shift in each of a plurality of resource elements.

41. The apparatus of claim 22, wherein the synchronization signal comprises at least one of: a primary synchronization signal (PSS), a secondary synchronization signal (SSS), or a combination thereof.

42. A non-transitory computer-readable medium storing computer-executable code for wireless communication at a user equipment (UE), the code executable by a processor to:
  receive a synchronization signal within a synchronization signal (SS) block, the synchronization signal having a first bandwidth;
  receive a physical broadcast channel (PBCH) of the SS block, the PBCH comprising a first portion having a second bandwidth within the first bandwidth and a second portion having a bandwidth that is outside of the second bandwidth and within a PBCH bandwidth, the PBCH bandwidth being greater than the first bandwidth; and
  decode the PBCH based on the first portion of the PBCH and exclusive of the second portion of the PBCH.

43. A method of wireless communication at a base station, comprising:
  transmitting at least one synchronization signal as part of a synchronization signal (SS) block, the at least one synchronization signal having a first bandwidth;
  formatting a physical broadcast channel (PBCH) to be transmitted within a PBCH bandwidth that is greater than the first bandwidth, the PBCH comprising a first portion to be transmitted within a second bandwidth that is within the first bandwidth and a second portion to be transmitted in a bandwidth that is outside of the second bandwidth and within the PBCH bandwidth, wherein the PBCH is able to be decoded based on the first portion of the PBCH and exclusive of the second portion of the PBCH; and
  transmitting the PBCH as part of the SS block.

44. The method of claim 43, further comprising:
  polar-encoding bits of the PBCH; and
  randomly interleaving the polar-encoded bits of the PBCH within at least the second bandwidth.

45. The method of claim 44, wherein interleaving the polar-encoded bits of the PBCH comprises:
  S-random interleaving the polar-encoded bits of the PBCH.

46. The method of claim 43, further comprising:
  polar-encoding bits of the PBCH; and
  interleaving the polar-encoded bits of the PBCH by using a triangular interleaver, a convolutional interleaver, a rectangular interleaver, or a Parallel-rectangular interleaver.

47. The method of claim 43, further comprising:
  polar-encoding bits of the PBCH; and
  mapping higher capacity polar-encoded bits of the PBCH to the second bandwidth.

48. The method of claim 43, further comprising:
  low-density parity-check (LDPC)-encoding bits of the PBCH; and
  mapping at least LDPC-encoded bits of the PBCH that are associated with a self-decodable core of an LDPC graph to the second bandwidth.

49. The method of claim 43, further comprising:
  encoding bits of the PBCH using a polar encoding, a low-density parity-check (LDPC) encoding, or a tail-biting convolutional code (TBCC) encoding; and
  mapping encoded bits representing all PBCH information to the second bandwidth.

50. The method of claim 49, further comprising:
  mapping encoded bits representing repeated PBCH information to the second bandwidth.

51. The method of claim 49, further comprising:
  mapping encoded bits representing repeated PBCH information to a portion of the PBCH bandwidth outside the second bandwidth.

52. The method of claim 43, further comprising:
  transmitting an indication that the SS block includes the first portion of the PBCH.

53. The method of claim 52, wherein transmitting the indication comprises:
  signaling the indication in the at least one synchronization signal.

54. The method of claim 53, wherein the at least one synchronization signal comprises a primary synchronization signal (PSS) transmitted from an antenna port of the base station and a secondary synchronization signal (SSS) transmitted from the antenna port of the base station, and signaling the indication in the at least one synchronization signal comprises:
  encoding the indication in a difference between the PSS and the SSS.

55. The method of claim 43, further comprising:
  transmitting at least one of: a first indication of the first bandwidth, a second indication of a sync signal frequency, or a combination thereof.

56. The method of claim 43, wherein the PBCH is mapped to tones in at least the second bandwidth using a tone mapping that begins within the second bandwidth and alternates about a sync signal frequency within at least the second bandwidth.

57. The method of claim 43, wherein the PBCH is mapped to tones in the second bandwidth using a tone mapping that begins within the second bandwidth and is sequential within the second bandwidth.

58. The method of claim 43, wherein the PBCH is transmitted in at least a first symbol and a second symbol and is rate matched to both the first symbol and the second symbol.

59. The method of claim 43, wherein the PBCH is transmitted in at least a first symbol and a second symbol and is rate matched to the first symbol and repeated in the second symbol.

60. The method of claim 59, wherein the PBCH is associated with a quasi-random phase shift in each of a plurality of resource elements.

61. The method of claim 43, wherein the at least one synchronization signal comprises at least one of: a primary synchronization signal (PSS), a secondary synchronization signal (SSS), or a combination thereof.

62. An apparatus for wireless communication at a base station, comprising:
 means for transmitting at least one synchronization signal as part of a synchronization signal (SS) block, the at least one synchronization signal having a first bandwidth;
 means for formatting a physical broadcast channel (PBCH) to be transmitted within a PBCH bandwidth that is greater than the first bandwidth, the PBCH comprising a first portion to be transmitted within a second bandwidth that is within the first bandwidth and a second portion to be transmitted in a bandwidth that is outside of the second bandwidth and within the PBCH bandwidth, wherein the PBCH is able to be decoded based on the first portion of the PBCH and exclusive of the second portion of the PBCH; and
 means for transmitting the PBCH as part of the SS block.

63. An apparatus for wireless communication at a base station, comprising:
 a processor;
 memory in electronic communication with the processor; and
 instructions stored in the memory, the instructions being executable by the processor to:
  transmit at least one synchronization signal as part of a synchronization signal (SS) block, the at least one synchronization signal having a first bandwidth;
  format a physical broadcast channel (PBCH) to be transmitted within a PBCH bandwidth that is greater than the first bandwidth, the PBCH comprising a first portion to be transmitted within a second bandwidth that is within the first bandwidth and a second portion to be transmitted in a bandwidth that is outside of the second bandwidth and within the PBCH bandwidth, wherein the PBCH is able to be decoded based on the first portion of the PBCH and exclusive of the second portion of the PBCH; and
  transmit the PBCH as part of the SS block.

64. The apparatus of claim 63, wherein the instructions are executable by the processor to:
 polar-encode bits of the PBCH; and
 randomly interleave the polar-encoded bits of the PBCH within at least the second bandwidth.

65. The apparatus of claim 64, wherein interleaving the polar-encoded bits of the PBCH comprises:
 S-random interleaving the polar-encoded bits of the PBCH.

66. The apparatus of claim 63, wherein the instructions are executable by the processor to:
 polar encode bits of the PBCH; and
 interleave the polar-encoded bits of the PBCH by using a triangular interleaver, a convolutional interleaver, a rectangular interleaver, or a Parallel-rectangular interleaver.

67. The apparatus of claim 63, wherein the instructions are executable by the processor to:
 polar-encode bits of the PBCH; and
 map higher capacity polar-encoded bits of the PBCH to the second bandwidth.

68. The apparatus of claim 63, wherein the instructions are executable by the processor to:
 low-density parity-check (LDPC)-encode bits of the PBCH; and
 map at least LDPC-encoded bits of the PBCH that are associated with a self-decodable core of an LDPC graph to the second bandwidth.

69. The apparatus of claim 63, wherein the instructions are executable by the processor to:
 encode bits of the PBCH using a polar encoding, a low-density parity-check (LDPC) encoding, or a tail-biting convolutional code (TBCC) encoding; and
 map encoded bits representing all PBCH information to the second bandwidth.

70. The apparatus of claim 69, wherein the instructions are executable by the processor to:
 map encoded bits representing repeated PBCH information to the second bandwidth.

71. The apparatus of claim 69, wherein the instructions are executable by the processor to:
 map encoded bits representing repeated PBCH information to a portion of the PBCH bandwidth outside the second bandwidth.

72. The apparatus of claim 63, wherein the instructions are executable by the processor to:
 transmit an indication that the SS block includes the first portion of the PBCH.

73. The apparatus of claim 72, wherein transmitting the indication comprises:
 signaling the indication in the at least one synchronization signal.

74. The apparatus of claim 73, wherein the at least one synchronization signal comprises a primary synchronization signal (PSS) transmitted from an antenna port of the base station and a secondary synchronization signal (SSS) transmitted from the antenna port of the base station, and signaling the indication in the at least one synchronization signal comprises:
 encoding the indication in a difference between the PSS and the SSS.

75. The apparatus of claim 63, wherein the instructions are executable by the processor to:
 transmit at least one of: a first indication of the first bandwidth, a second indication of a sync signal frequency, or a combination thereof.

76. The apparatus of claim 63, wherein the PBCH is mapped to tones in at least the second bandwidth using a tone mapping that begins within the second bandwidth and alternates about a sync signal frequency within at least the second bandwidth.

77. The apparatus of claim 63, wherein the PBCH is mapped to tones in the second bandwidth using a tone mapping that begins within the second bandwidth and is sequential within the second bandwidth.

78. The apparatus of claim 63, wherein the PBCH is transmitted in at least a first symbol and a second symbol and is rate matched to both the first symbol and the second symbol.

79. The apparatus of claim 63, wherein the PBCH is transmitted in at least a first symbol and a second symbol and is rate matched to the first symbol and repeated in the second symbol.

80. The apparatus of claim 79, wherein the PBCH is associated with a quasi-random phase shift in each of a plurality of resource elements.

81. The apparatus of claim 63, wherein the at least one synchronization signal comprises at least one of: a primary synchronization signal (PSS), a secondary synchronization signal (SSS), or a combination thereof.

82. A non-transitory computer-readable medium storing computer-executable code for wireless communication at a base station, the code executable by a processor to:
- transmit at least one synchronization signal as part of a synchronization signal (SS) block, the at least one synchronization signal having a first bandwidth;
- format a physical broadcast channel (PBCH) to be transmitted within a PBCH bandwidth that is greater than the first bandwidth, the PBCH comprising a first portion to be transmitted within a second bandwidth that is within the first bandwidth and a second to be transmitted in a bandwidth that is outside of the second bandwidth and within the PBCH bandwidth, wherein the PBCH is able to be decoded based on the first portion of the PBCH and exclusive of the second portion of the PBCH; and
- transmit the PBCH as part of the SS block.

\* \* \* \* \*